(12) United States Patent
Porter et al.

(10) Patent No.: US 11,893,042 B2
(45) Date of Patent: Feb. 6, 2024

(54) METHODS AND SYSTEMS FOR AUTOMATICALLY RESHARDING A SHARDED COLLECTION OF DATA

(71) Applicant: MongoDB, Inc., New York, NY (US)

(72) Inventors: Mark Porter, Seattle, WA (US); Max Jacob Hirschhorn, New York, NY (US); Daniel William Gottlieb, Long Island City, NY (US); Garaudy Etienne, Brooklyn, NY (US); Andrew Michalski Schwerin, Brooklyn, NY (US); Judah Schvimer, New York, NY (US); Siyuan Zhou, Weehawken, NJ (US); Kaloian Manassiev, Barcelona (ES); Esha Maharishi, Ashburn, VA (US)

(73) Assignee: MongoDB, Inc., New York, NY (US)

( * ) Notice: Subject to any disclaimer, the term of this patent is extended or adjusted under 35 U.S.C. 154(b) by 25 days.

(21) Appl. No.: 17/856,171

(22) Filed: Jul. 1, 2022

(65) Prior Publication Data

US 2023/0009909 A1   Jan. 12, 2023

Related U.S. Application Data

(60) Provisional application No. 63/220,121, filed on Jul. 9, 2021.

(51) Int. Cl.
*G06F 16/27* (2019.01)
*G06F 16/28* (2019.01)

(52) U.S. Cl.
CPC .......... *G06F 16/278* (2019.01); *G06F 16/285* (2019.01)

(58) Field of Classification Search
CPC .......................... G06F 16/278; G06F 16/285
See application file for complete search history.

(56) References Cited

U.S. PATENT DOCUMENTS

| | | | |
|---|---|---|---|
| 10,997,211 B2 * | 5/2021 | Merriman | G06F 16/278 |
| 11,030,169 B1 * | 6/2021 | Wu | G06F 16/22 |
| 2017/0103116 A1 * | 4/2017 | Hu | G06F 16/2455 |
| 2017/0169087 A1 * | 6/2017 | Kapadia | G06F 11/2097 |
| 2017/0169091 A1 * | 6/2017 | Kapadia | G06F 16/273 |
| 2018/0060037 A1 * | 3/2018 | Johnson | G06F 16/2282 |
| 2018/0314750 A1 * | 11/2018 | Merriman | H04L 67/1097 |
| 2019/0102476 A1 * | 4/2019 | Liu | G06F 16/30 |
| 2019/0278860 A1 * | 9/2019 | Modai | G06F 16/278 |
| 2022/0027337 A1 * | 1/2022 | Haberkorn | G06F 16/1858 |

* cited by examiner

*Primary Examiner* — Jorge A Casanova
(74) *Attorney, Agent, or Firm* — Wolf, Greenfield & Sacks, P.C.

(57) ABSTRACT

A method is provided for resharding a sharded database sharded according to a first shard key. The method includes: receiving, by a processor an instruction to reshard the sharded database; receiving, at the processor, a new shard key to be used in a resharding process to reshard the sharded database; determining, by the processor, whether a duration of unavailability of the sharded database during the resharding process is less than a predetermined amount of time; and automatically performing, by the processor, the resharding process according to the new shard key to produce a resharded database, if the duration of unavailability is less than the predetermined amount of time. The method may be performed without users noticing a significant interruption to read/write operations from/to the database.

18 Claims, 7 Drawing Sheets

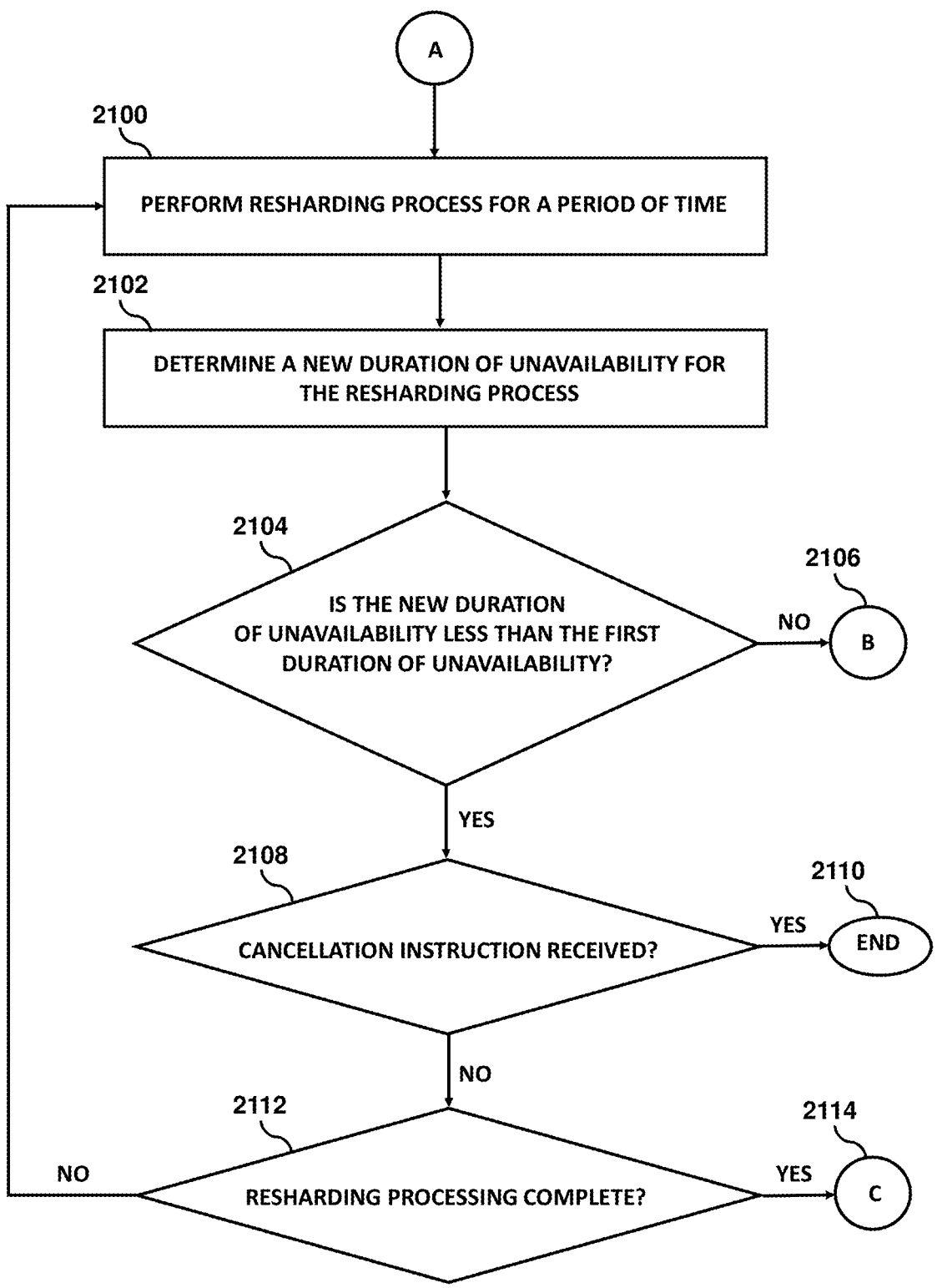

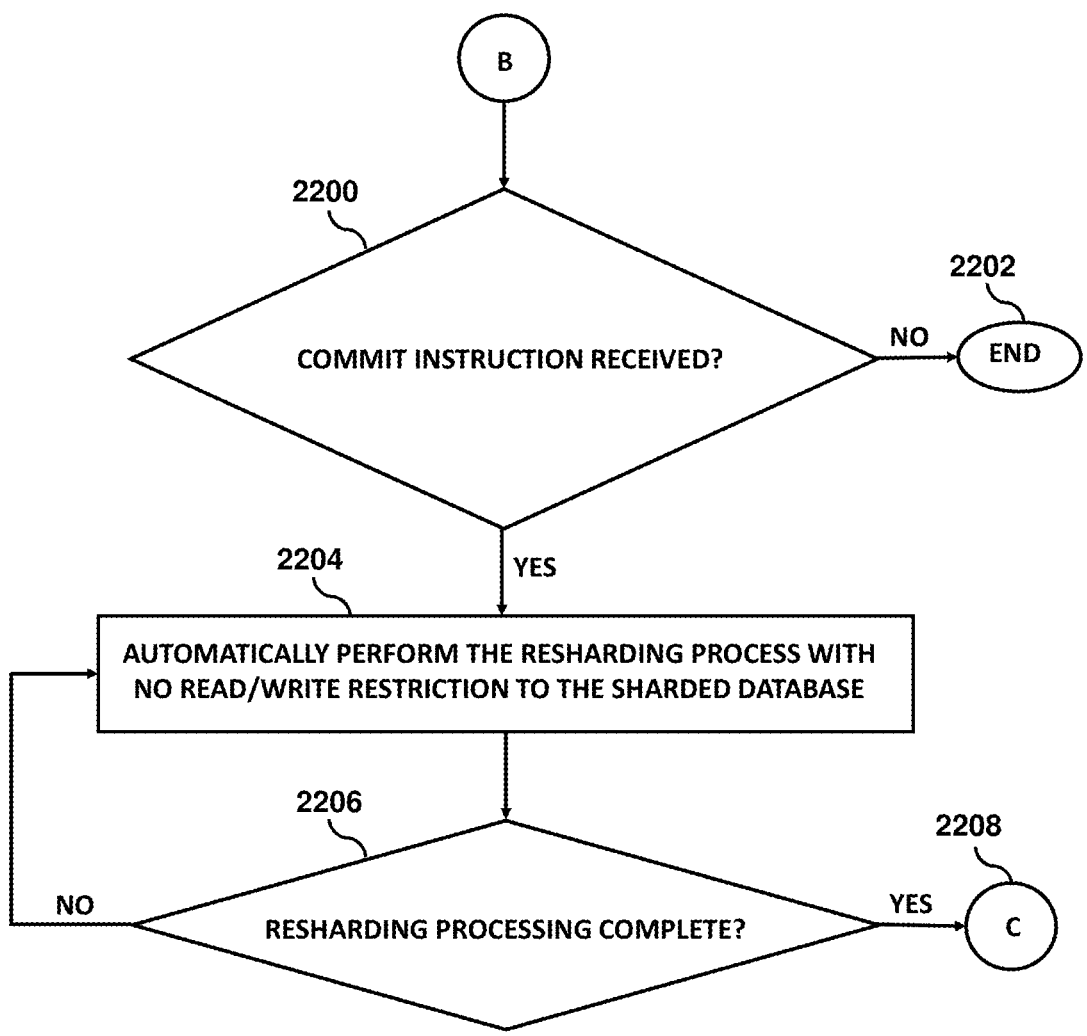

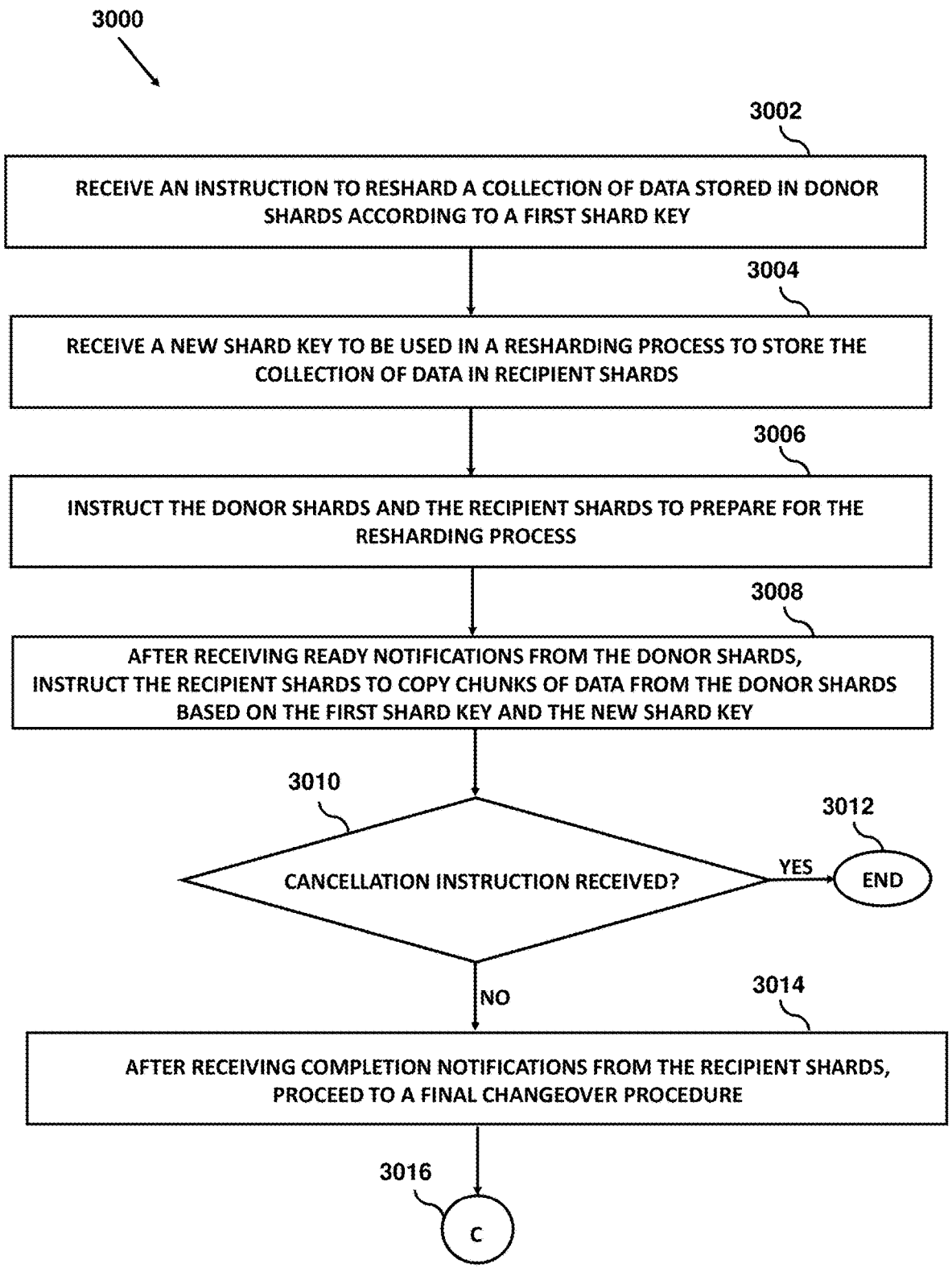

METHODS AND SYSTEMS FOR AUTOMATICALLY RESHARDING A SHARDED COLLECTION OF DATA

CROSS REFERENCE TO RELATED APPLICATIONS

The present patent application claims the benefit of priority of U.S. Provisional Application No. 63/220,121 filed Jul. 9, 2021, entitled "METHODS AND SYSTEMS FOR AUTOMATICALLY RESHARDING A SHARDED COLLECTION OF DATA," the entire contents of which is incorporated by reference herein.

NOTICE OF COPYRIGHT RIGHTS

A portion of the disclosure of the present patent application contains material that is subject to copyright protection. The copyright owner has no objection to the facsimile reproduction by anyone of the present patent application as it appears in the U.S. Patent and Trademark Office's patent files or records, but otherwise reserves all copyright rights whatsoever.

FIELD

The present invention relates generally to automated organization of a collection of data that may be stored in a distributed database. More specifically, the present invention relates to methods and systems in which a collection of data organized and stored according to an old key, which represents an old scheme for dividing and storing the collection of data in a distributed database, is reorganized and stored according to a new key, which represents a new scheme for dividing and storing the collection of data. Various embodiments of the invention described herein relate to automatically "resharding" a collection of data from an old organization scheme, in which the collection of data is divided into shards respectively containing portions of the collection of data according to an old shard key, to a new organization scheme, in which the collection of data is divided into new shards respectively containing portions of the collection of data according to a new shard key.

BACKGROUND

Sharding is the process of storing a database or collection of data (e.g., documents, records, datafiles, and the like) in shards across multiple machines, which may be referred to as a cluster. A sharded database may be comprised of a plurality of shards stored in the cluster and organized according to a shard key. Each shard may store one or more portions of the database, according to the shard key. The shard key may include an index that designates how items of data of the database are "sharded" or distributed among the shards. How a database is sharded may affect operations to and from the database. An inefficiently sharded database may be associated with delays in accessing items stored in one or more shards of the database, compared with accessing the same items stored in the same database but sharded more efficiently. Once a database is sharded, however, its shard key generally is immutable without incurring a significant downtime for the database and/or without expending a significant amount of human effort.

SUMMARY

Aspects of the technology presented herein relate to resharding a sharded database or collection of data to produce a resharded database. The sharded database may be sharded or organized into shards according to a first shard key, which may define how the collection of data is divided and stored according to a first scheme. Shards of the sharded database may be stored in a cluster of storage devices, such that portions of the database are distributed among the storage devices of the cluster. For example, the collection of data may include surnames of individuals, and the first shard key may divide the collection of data into three shards stored in different servers. The first shard may include surnames beginning with letters from A through G, the second shard may include surnames beginning with letters from H through M, and the third shard may include surnames beginning with letters from N through Z. The resharded database may be sharded according to a new shard key different from the first shard key. Shards of the resharded database may be stored in a cluster that may be the same as the cluster storing the sharded database, albeit contents of the shards of the resharded database may be different from contents of the shards of the sharded database. Continuing with the example above, the collection of data in the resharded database may be sharded according to a second shard key that divides the collection of data into five shards stored in different parts of the cluster or in another cluster. The first shard may include surnames beginning with letters from A through D, the second shard may include surnames beginning with letters from E through H, the third shard may include surnames beginning with letters from I through M, the fourth shard may include surnames beginning with letters from N through R, and the fifth shard may include surnames beginning with letters from S through Z.

According to an aspect of the present invention, a computer-implemented method is provided for resharding a sharded database to a resharded database. The sharded database may be a collection of data sharded according to a first shard key. The resharded database may be the same collection of data sharded according to a new shard key. The method may be comprised of steps of: (a) receiving, by a processor, an instruction to reshard the sharded database; (b) receiving, at the processor, the new shard key to be used in a resharding process to reshard the sharded database; (c) determining, by the processor, whether a duration of unavailability of the sharded database during the resharding process is less than a predetermined amount of time; and (d) automatically performing, by the processor, the resharding process according to the new shard key, if the duration of unavailability is less than the predetermined amount of time, to produce the resharded database. The processor may be comprised of one or more CPU(s).

In some embodiments of this aspect, the method may further be comprised of a step of: (e) commencing, by the processor, the resharding process prior to step (c).

In some embodiments of this aspect, the duration of unavailability may be a first duration of unavailability, and the method may further be comprised of: (f) performing, by the processor, the resharding process for a first period of time if the first duration of unavailability is determined to be equal to or greater than the predetermined amount of time; (g) determining, by the processor after the first period of time, whether a current duration of unavailability of the sharded database is less than the first duration of unavailability; and (h) performing, by the processor, the resharding process for a second period of time if the current duration of unavailability is less than the first duration of unavailability.

In some embodiments of this aspect, the method may further be comprised of a step of: (i) automatically cancelling, by the processor, the resharding process if the current duration of unavailability determined at step (g) is equal to or greater than the first duration of unavailability.

In some embodiments of this aspect, the method may further be comprised of steps of, after step (h): (j) repeating, by the processor, a combination of one or more of steps (c), (d), (f), (g), and (h) using the current duration of unavailability as the first duration of unavailability.

In some embodiments of this aspect, the method may further be comprised of steps of: (k) permitting, by the processor, read and write operations to and from the sharded database during the resharding process until a final changeover procedure of the resharding process; and (1) preventing, by the processor, read and write operations to and from the sharded database during the final changeover procedure.

In some embodiments of this aspect, during the final changeover procedure, the sharded database becomes unavailable, and a resharded database resulting from the resharding process becomes available and replaces the sharded database. In some embodiments of this aspect, the method may further be comprised of: holding, by the processor during the changeover procedure, all write requests and read requests to the sharded database; and performing, by the processor, the write requests and the read requests held in the holding step after the sharded database has been replaced by the resharded database.

In some embodiments of the aspect, the method may further be comprised of a step of: receiving, by the processor, a cancellation instruction during the performing of the resharding process; and ending, by the processor after the receiving of the cancellation instruction, the resharding process before the resharding process is completed.

In some embodiments of this aspect, the method may further be comprised of a step of: providing, by the processor, an estimated amount of time to completion of the resharding process. In some embodiments, the providing of the estimated amount of time to completion is in response to a request received by the processor.

In some embodiments of this aspect, the method may further be comprised of a step of: providing, by the processor, the duration of unavailability. In some embodiments, the providing of the duration of unavailability is in response to a request received by the processor.

In some embodiments of this aspect, the method may further be comprised of a step of: providing, by the processor, an indication of whether a write operation is being blocked due to the resharding process. In some embodiments, the providing of the indication may be comprised of: receiving, by the processor, a blockage status request, and determining, by the processor, whether a write operation currently is being blocked.

In some embodiments of this aspect, the method may further be comprised of a step of: providing, by the processor, a warning notification when the duration of unavailability is equal to or greater than the predetermined amount of time. In some embodiments, the method may further be comprised of steps of: receiving, by the processor, an instruction to commit to the resharding process; and automatically performing, by the processor, the resharding process to completion if the instruction to commit has been received after a warning notification regarding the duration of unavailability has been provided.

In some embodiments of this aspect, the method may further be comprised of a step of: providing, by the processor prior to step (a), an indication of an amount of system resources required to reshard the sharded database.

According to another aspect of the present invention, a computer-implemented system is provided for resharding a sharded database of a collection of data. The system may be comprised of: a processor in communication with one or more first memories and one or more second memories, wherein the one or more first memories are for storing the collection of data according to a first shard key corresponding to the sharded database, and wherein the one or more second memories are for storing the collection of data according to a new shard key corresponding to a resharded database, the new shard key being different from the first shard key. The processor may be programmed to perform acts comprised of: (a) receiving an instruction to reshard the sharded database; (b) receiving the new shard key to be used in a resharding process to reshard the sharded database; (c) determining whether a duration of unavailability of the sharded database during the resharding process is less than a predetermined amount of time; and (d) automatically performing the resharding process according to the new shard key, if the duration of unavailability is less than the predetermined amount of time, to produce the resharded database.

According to yet another aspect of the present invention, a computer-readable storage medium is provided in which is stored code that, when executed by a processor, causes the processor to perform a method of resharding a sharded database of a collection of data sharded according to a first shard key. The method may be comprised of steps of: (a) receiving an instruction to reshard the sharded database; (b) receiving a new shard key to be used in a resharding process to reshard the sharded database; (c) determining whether a duration of unavailability of the sharded database during the resharding process is less than a predetermined amount of time; and (d) automatically performing the resharding process according to the new shard key to produce a resharded database of the collection of data, if the duration of unavailability is less than the predetermined amount of time.

The foregoing and other aspects, embodiments, and features of the present invention disclosed herein, as well advantages thereof, may be more fully understood from the detailed description set forth below considered in conjunction with the accompanying drawings.

BRIEF DESCRIPTION OF THE DRAWINGS

The skilled artisan will understand that the figures in the accompanying drawings, described herein, are for illustration purposes only. It is to be understood that in some instances various aspects of the invention may be shown exaggerated or enlarged to facilitate an understanding of the invention. In the drawings, like reference characters generally refer to like features, which may be functionally similar and/or structurally similar elements, throughout the various figures. The drawings are not necessarily drawn to scale, as emphasis is instead placed on illustrating and teaching principles of the various aspects of the invention. The drawings are not intended to limit the scope of the present teachings in any way.

FIGS. 2A, 2B, 2C, and 2D show flow charts for a computer-implemented automatic resharding process, according to some embodiments of the present invention; and FIG. 3 shows a flow chart for a computer-implemented automatic resharding process, according to some embodiments of the present invention.

DETAILED DESCRIPTION

Sharding may be a versatile approach to organizing a database storing a large quantity of data. When a collection of data is large or grows to become large, storing the entire collection of data in a single machine may be inefficient, largely because accessing a particular item of data may be a slow process. Delays experienced by users trying to perform a read operation or a write operation ("read/write" operation herein) from/to a database may result in unsatisfactory user experiences and, in some cases, may adversely affect the business of the owner of the database. For example, if the database is for an e-commerce website, delays experienced by customers trying to perform read/write operations from/to the database may result in a decrease in customer traffic to the website, which could adversely affect an income stream generated by the website. With sharding, however, the collection of data may be divided into multiple shards according to a shard key, which may define how the collection of data is divided or split up, and the shards may be stored in different memories in the same machine or in different memories in a cluster of different machines. Each shard may hold a subset of the collection of data. By splitting up the collection of data into pieces, read/write operations may occur relatively quickly.

For example, for a read/write operation involving a particular item of data in a sharded collection of data, once the shard containing the item of data is identified, the item of data may be accessed quickly and a read/write operation involving the item of data may be performed immediately (e.g., in less than a second). (The phrase "sharded collection of data" may be used herein to refer to a collection of data that has been divided into shards according to a shard key, with the shards being stored in a cluster of storage devices.) Each shard may be comprised of chunks. As the collection of data grows in size, the chunks may be subdivided and additional memories may be used to store portions of the subdivided chunks. Thus, sharding may be scalable and may enable items of data in the multiple shards of the sharded collection of data to continue to be accessed relatively quickly as the collection of data grows, in contrast to the same collection of data stored without sharding.

Figure 1A:
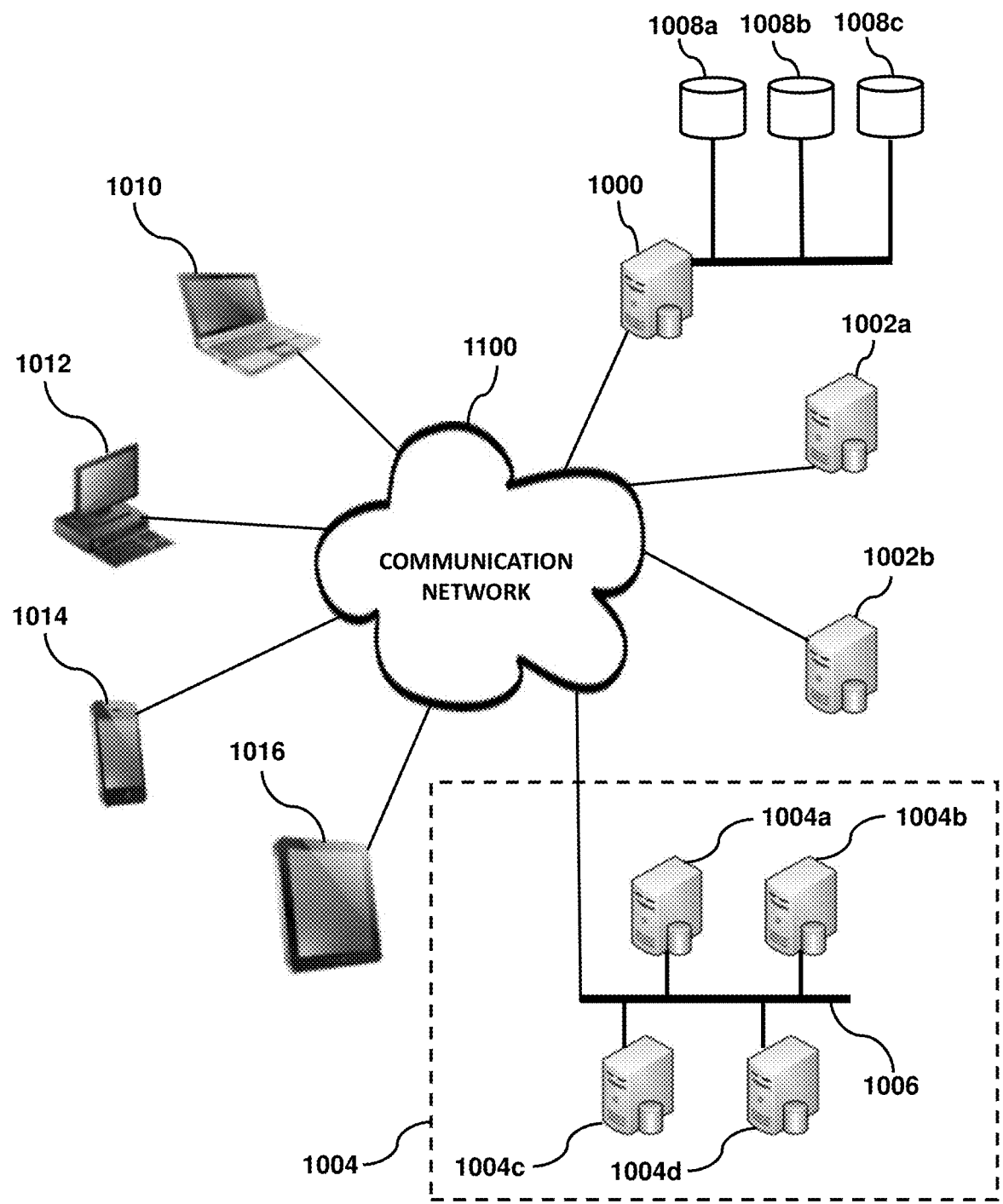
FIG. 1A schematically shows an arrangement of machines that may be used in interactions involving a collection of data, according to some embodiments of the present invention.
Figure 1B:
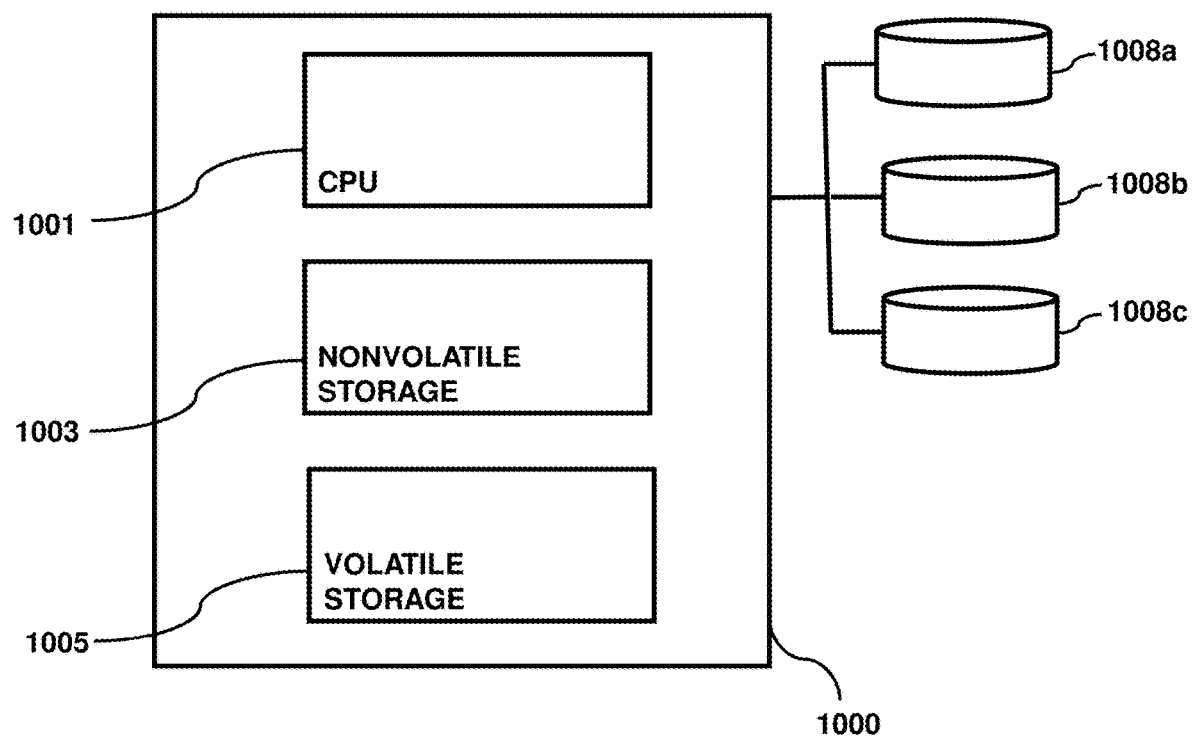
FIG. 1B schematically shows a database server that may be used to store one or more shards, according to some embodiments of the present invention.

FIG. 1A schematically shows an arrangement of machines that may be used in interacting with a sharded collection of data and/or with storing the sharded collection of data and/or with resharding the sharded collection of data. The sharded collection of data may be hosted on a non-relational database, a database having dynamic schema, an unstructured database, a partially unstructured database, or a relational database. The underlying data of the collection of data may be any type of data (e.g., documents, key/value pairs, graphs, tabular data, etc.). A reference may be made herein to one type of data (e.g., documents) for the purpose of illustrating an example, and such a reference should not be construed to limit the scope of the disclosure to be applicable only to that type of data. Shards of the sharded collection of data may be stored in any one or any combination of database servers and/or memory devices associated with one or more database servers. FIG. 1B schematically shows a database server 1000, which is an example of a server that may be enhanced over conventional systems and configured to store one or more shards. The server 1000 may be comprised of at least one central processing unit (CPU) 1001 configured to perform processes according to code and/or data stored in a nonvolatile storage device 1003 and/or a volatile storage device 1005. Although only one CPU 1001 is shown in FIG. 1B, it should be understood that the CPU 1001 may be part of a processor of the server 1000, and the processor may include the CPU 1001 by itself or may include multiple CPUs of which the CPU 1001 is a member. In some embodiments of the present invention, the server 1000 may be configured to execute code to execute a resharding process described herein. The server 1000 may store one or more shards of the collection of data itself (e.g., in a local memory of the server 1000) and/or in data storage devices 1008a, 1008b, 1008c accessible by the server 1000 and/or in separate database servers 1002a, 1002b that are in communication with the server 1000 via a communication network 1100. In some embodiments, the shards of the collection of data may be stored in a data storage facility 1004 comprised of a plurality of database servers 1004a, 1004b, 1004c, 1004d, with individual ones of the shards being stored in a single server of the data storage facility 1004 or in two or more of the servers 1004a, 1004b, 1004c, 1004d of the data storage facility 1004. The servers 1004a, 1004b, 1004c, 1004d may be locally connected to each other via a communication bus 1006. In some embodiments, one or more of the servers 1002a, 1002b, 1004a, 1004b, 1004c, 1004d may be configured the same as or similar to the server 1000 shown in FIG. 1B. In some embodiments, one or more of the servers 1000, 1002a, 1002b, 1004a, 1004b, 1004c, 1004d may be programmed to perform a resharding processing described herein.

Users may interact with the collection of data via the communication network 1100 using known types of communication devices. For example, a user may use a laptop computer 1010, a workstation 1012, a smartphone 1014, a tablet computer 1016, or a combination of these known types of communication devices to access an item of data of the collection. Similarly, the owner of the collection may manage the collection via the communication network 1100 using a known type of communication device (e.g., a workstation 1012). In some embodiments, the owner may initiate an automatic resharding process to reshard the collection by inputting an instruction via the communication network 1100 using a known type of communication device. As will be appreciated, communication devices other than those shown in FIG. 1A may be used by users and owners to interact with the collection via the communication network 1100.

The communication network 1100 may be any medium for transmitting information. For example, the communication network 1100 may be any one or any combination of: a local-area network (LAN), a metropolitan-area network (MAN), a wide-area network (WAN), a wireless network, and the Internet.

A sharded database or sharded collection of data may be organized according to a shard key, which may determine how portions of the database are distributed among the various machines storing the shards of the database. The shard key may be an indexed field included in each item of data of the database. The database may contain different categories of data, and the shard key may be a map or directory to how the categories of data of the database are distributed among the shards. In some embodiments, data location information can be stored as metadata, and the metadata can be used to optimize access to the data of the sharded collection of data. According to one example, a database of customers may include categories such as first name; last name; date of birth; zip code; hobbies; pets; alma mater; gender(s); social-media followers; products purchased; products returned; webpage browsing history; product browsing history; social-media posts; etc. A vertically sharded database may be sharded to include one or more categories of data. A horizontally sharded database may be sharded by one or more ranges (e.g., last names starting with A to L and last names starting with M to Z; birth years in and before 1979, birth years from 1980 through 1999, and birth years in and after 2000; social-media posts before 2020 and social-media posts in and after 2020; etc.).

The choice of shard key for a database can affect overall performance of operations from/to the cluster containing the shards of the database. Ideally, the shard key distributes the database evenly among the shards and takes into consideration the relative frequencies that items of data in the different shards will be accessed. For example, a database containing 1 TB of data may be stored in three balanced shards: Shard A containing 100 GB of frequently accessed data, Shard B containing 300 GB of moderately accessed data, and Shard C containing 600 GB of infrequently accessed data. In this example, although the amount of data may be different in each shard, the differences in the frequency of access for the three shards result in an overall balance of these shards. Frequency of access and other performance metrics can be stored as metadata, and used to optimize access, for example, based on load.

However, as will be appreciated, contents of the database may change with time and may change to such an extent that a shard with frequently accessed data or moderately accessed data may grow to contain, e.g., over 75% of the items of data in the database. Additionally, the popularity of one or more items of data in an infrequently accessed shard may change with time and become very popular. With such changes, read/write operations from/to a shard containing one or more frequently accessed items of data may become slower and slower, with noticeable delays experienced by users. For example, if a database is sharded to have three shards: a first shard that contains last names from A to L, date of birth, zip code, hobbies, pets, alma mater, social-media followers, and social-media posts; a second shard that contains last names from M to Z, date of birth, zip code, hobbies, pets, alma mater, social-media followers, and social-media posts; and a third shard that contains gender(s), products purchased, products returned, webpage browsing history, and product browsing history, the second shard may become disproportionately larger in size if, e.g., customers having surnames of Smith and Zulo become popular social-media influencers with large numbers of followers who frequently look for Smith's and/or Zulo's social-media posts. In such a case, the shards of the database may be imbalanced, and read/write operations involving the second shard may be noticeably slower than those involving the first and third shards.

Typically, once a collection of data has been sharded according to a shard key, the shard key is immutable. This can lead to performance problems if the collection is improperly sharded from the start (e.g., due to misinformation about the relative popularity of different categories of the collection of data) or if the shards become imbalanced with time, as mentioned above.

The inventors have recognized and appreciated that a database owner may be reluctant to perform a "live migration" or to deactivate his/her database for more than a maximum amount of downtime (e.g., 2 minutes, or 5 minutes, or 10 minutes) to manually reshard the database. Both options may be expensive, time-consuming, and/or complex and challenging to implement. Moreover, both options may be associated with an uncomfortable level of risk of data corruption or even data loss.

In manual resharding, the owner may need to take the sharded database containing the collection of data offline for a period of time in order to manually unshard or reassemble the collection of data, which may be stored in several different machines. The owner may then need to perform a wholly new process to shard the reassembled collection according to a new shard key. Such a manual process is sometimes referred to as "dumping and reloading." As will be appreciated, a business's collection of data may be vital to bringing in revenue for the business. Therefore, the amount of time the collection of data is not accessible by customers may affect the business's revenue. The inventors have estimated that, in some cases, the downtime experienced by relatively larger collections of data may be on the order of days. For example, it has been estimated that to dump and reload a 10-TB collection of data sharded in a three-shard cluster, the owner of the collection of data would have to take the sharded database containing the collection of data offline for three days. Although it may be possible to keep the original three-shard cluster available (i.e., online) for read operations, write operations would be disrupted and therefore payment operations and/or purchase-order operations would be interrupted.

In a live migration, the sharded database containing the collection of data typically may be transferred from the shards of the old cluster to new shards stored in a new cluster without interrupting the accessibility of the collection of data for a noticeable amount of downtime (e.g., on the order of approximately five minutes). As will be appreciated, live migrations may be complex and risky, and typically would require the owner to prepare code with query routing and migration logic. Further, the customer would need to constantly monitor progress of the migration to handle potential unforeseen migration bugs or glitches. Furthermore, the owner would need to check the integrity of the migrated collection of data to make sure that no data was lost or corrupted during the migration. Although a live migration typically would not entail any significant access interruption to the collection of data, it is more costly and time-consuming for the owner than manual resharding. For example, it has been observed that in some cases a live migration of a collection containing ten billion documents, from an old cluster to a new cluster, took three months to complete.

The inventors have recognized and appreciated the difficulties in resharding a sharded database or collection of data, and have developed an automated resharding scheme, aspects of which are disclosed herein.

Figure 2A:
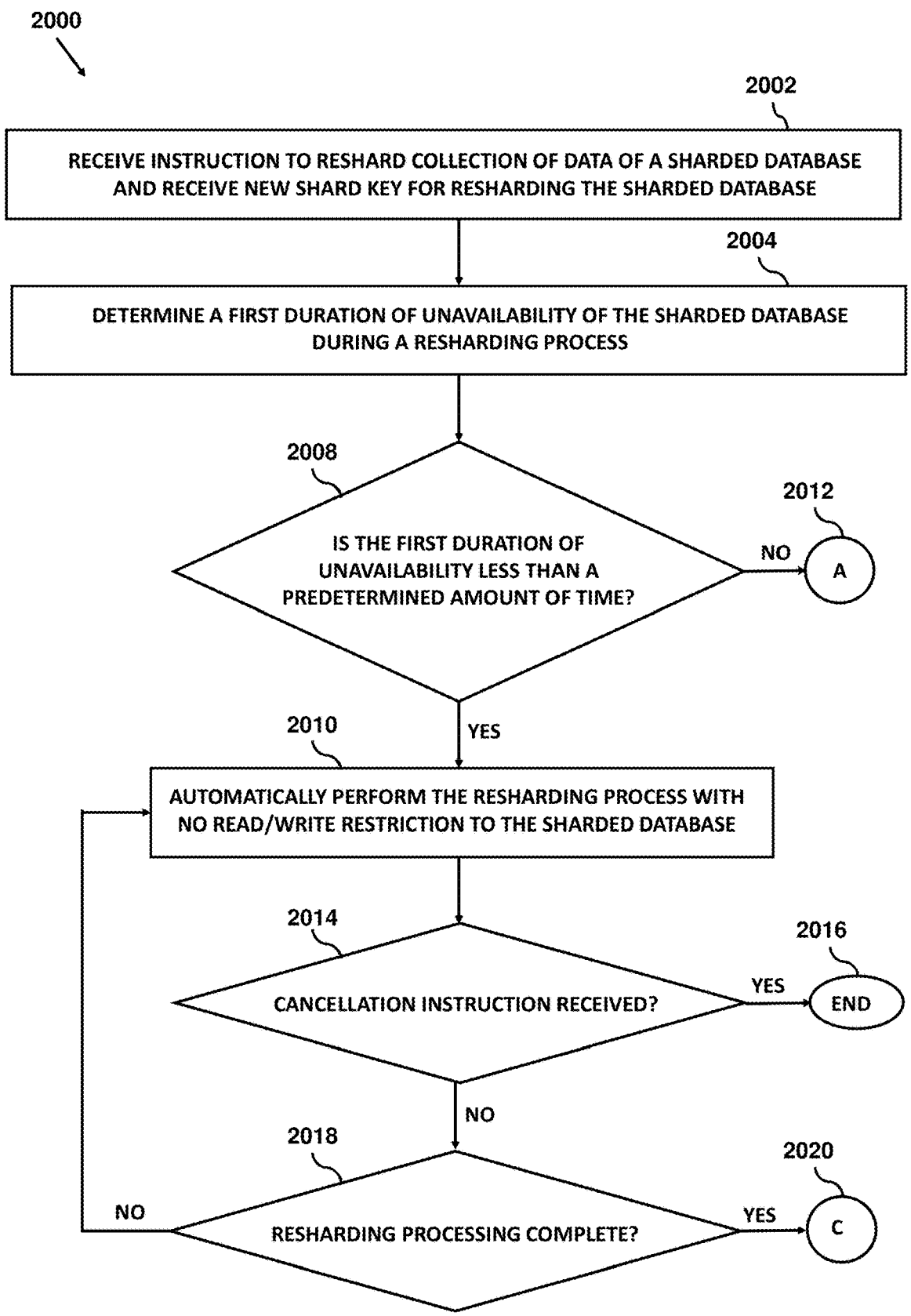

FIG. 2A shows a flowchart 2000 for aspects of a computer-implemented procedure for automated resharding, according to some embodiments of the present invention. At act 2002, a processor may receive an instruction to reshard a sharded collection of data. The processor may be comprised of one or more CPUs (e.g., the CPU 1001 of the database server 1000). For example, the owner or manager of the sharded collection of data may send a command to a resharding module stored in the server to initiate an automatic resharding process according to computer-readable code stored in the resharding module. Along with the instruction, the processor may receive a first shard key and a new shard key. The sharded collection of data may be distributed in one or more first memories according to the first shard key. The new shard key may indicate how the sharded collection of data is to be distributed in one or more second memories after the resharding process is completed.

In some embodiments, the owner or manager may provide to the processor an indication of an amount of storage space available for new shards.

At act 2004, the processor may determine a first duration of unavailability of the sharded collection of data during the resharding process. In some embodiments of the present invention, the first duration of unavailability may be an estimated delay in accessing the collection of data to perform a read/write operation during the resharding process.

At act 2008, the processor may determine whether the first duration of unavailability is less than a predetermined amount of time. In some embodiments, the predetermined amount of time may be in a range of 0.5 second to 10 seconds, in a range of 2 seconds to 5 seconds, or in a range of 1 second to 4 seconds. If the answer is yes at act 2008, (i.e., the first duration of unavailability is less than the predetermined amount of time), the resharding process may proceed to act 2010, where the processor may automatically perform the resharding process. The resharding process may be performed by the processor without interrupting or restricting read/write operations from/to the sharded collection of data. That is, a user may interact with the sharded collection of data without knowing that the sharded collection of data is undergoing resharding.

In some embodiments, the processor may monitor for additional instructions from the owner or manager of the sharded collection of data. At act 2014, a determination may be made as to whether a cancellation instruction has been received. That is, any time prior to completion of the resharding process, the owner or manager of the sharded collection of data may instruct the processor to abort the resharding process. If the answer is yes at act 2014 then, at act 2016, the procedure for automated resharding may end without completion. If the answer is no at act 2014 then, at act 2018, a determination may be made as to whether the resharding process has completed. If the answer is no at act 2018 (i.e., the resharding process is not yet complete), the procedure for automated resharding may continue and loop back to act 2010, as shown in FIG. 2A. If the answer is yes at act 2018 (i.e., the resharding process has completed) then, at act 2020, the procedure for automated resharding may proceed to routine C, where a final changeover procedure may be performed.

Returning to act 2008, if the answer is no at act 2008 (i.e., the first duration of unavailability is not less than the predetermined amount of time) then, at act 2012, the procedure for automated resharding may proceed to routine A. FIG. 2B shows a flowchart for routine A, according to some embodiments of the present invention. At act 2100, the processor may perform the resharding process for a first period of time. In some embodiments, the first period of time may be in a range of 30 seconds to 5 minutes, or in a range of 2 minutes to 4 minutes, or in a range of 1 minute to 3 minutes. At act 2102, the processor may determine an estimate for a new or current duration of unavailability. At act 2104, the processor may determine whether the new or current duration of unavailability is less than the first duration of unavailability. If the answer is yes at act 2104 (i.e., the new or current duration of unavailability is less than the first duration of unavailability), the resharding process may proceed for a second period of time. The processor may monitor for additional instructions from the owner or manager of the sharded collection of data. At act 2108, a determination may be made as to whether a cancellation instruction has been received. If the answer is yes at act 2108 then, at act 2110, the procedure for automated resharding may end without completion. If the answer is no, at act 2112, a determination may be made as to whether the resharding process has completed. If the answer is no at act 2112 (i.e., the resharding process is not yet complete), the procedure for automated resharding may continue and loop back to act 2100.

Returning to act 2104, if the answer is no at act 2104 (i.e., the new or current duration of unavailability is not less than the first duration of unavailability) then, at act 2106, the procedure for automated resharding may proceed to routine B. FIG. 2C shows a flowchart for routine B, according to some embodiments of the present invention.

At act 2200, the processor may determine whether the owner or manager of the sharded collection of data has provided an instruction to commit to resharding the sharded collection of data. In some embodiments of the present invention, the owner or manager of the sharded collection of data may agree to continue the resharding process even though there may be read/write interruptions longer than the predetermined amount of time, by sending a commit instruction to the processor. If, at act 2200, the processor determines that no commit instruction has been received then, at 2202, the procedure for automated resharding may end without completion. On the other hand, if at act 2200 the answer is yes (i.e., the commit instruction has been received) then, at act 2204, the processor may automatically perform the resharding process without interrupting or restricting read/write operations from/to the sharded collection of data. At act 2206, a determination may be made as to whether the resharding process has completed. If the answer is no at act 2206 (i.e., the resharding process is not yet complete), the procedure for automated resharding may continue and loop back to act 2204. If the answer is yes at act 2206 (i.e., the resharding process has completed) then, at act 2208, the procedure for automated resharding may proceed to routine C, where the final changeover procedure is performed.

As will be appreciated, when the resharding process is aborted by the owner or manager of the sharded collection of data, or if the procedure for automated resharding terminates the resharding process before completion, the sharded collection of data will continue to be accessible to users as if no processing for resharding has occurred. That is, the sharded collection of data remains sharded according to the first shard key, and read/write operations may take place from/to the sharded collection of data as originally sharded (i.e., according to the first shard key).

Figure 2D:
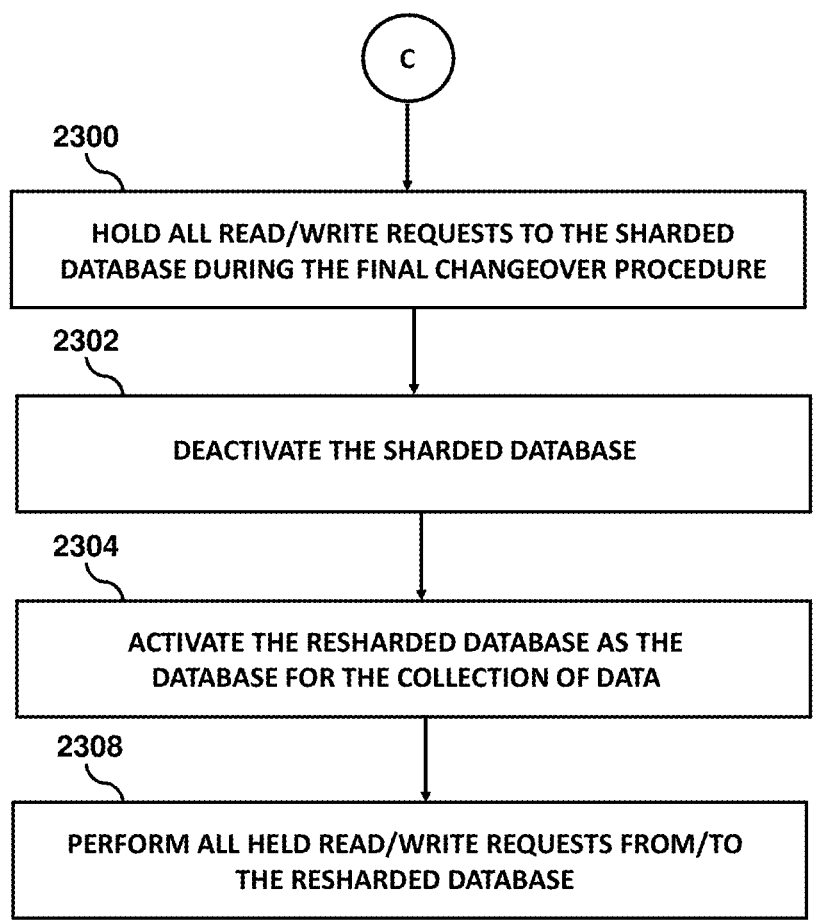

FIG. 2D shows a flowchart for the final changeover procedure of routine C, which may take place after the resharding process has completed, according to some embodiments of the present invention. During the final changeover procedure, the sharded collection of data ("old sharded collection" or collection sharded according to the first shard key) is deactivated and the resharded collection of data ("new sharded collection of data" or collection of data sharded according to the new shard key) is brought online to replace the old sharded collection.

At act 2300, read/write operations to/from the old sharded collection are stopped. The processor may hold read requests and write requests without losing these requests. At act 2302, the old sharded collection may be taken offline or deactivated by the processor. At act 2304, the new sharded collection may be put online or activated by the processor to replace the old sharded collection. At act 2308, the processor may release the read requests and write requests that have been held, so that these requests may be performed from/to the new sharded collection. Once activated, read/write operations from/to the resharded collection of data may take place via the new shards defined by the new shard key. Users may interact as usual with the resharded collection of data without noticing that the sharded collection of data has been resharded according to the new shard key.

In some embodiments of the present invention, a duration of the final changeover procedure may be for less than a predetermined amount of time. For example, the duration of the final changeover procedure may be in a range of 0.8 second to 15 seconds, or in a range of 1 second to 5 seconds.

In some embodiments of the present invention, the processor may provide an estimated amount of time to completion of the resharding process. For example, the estimated amount of time to completion may be provided in response to an inputted inquiry by the user or manager of the sharded collection of data.

In some embodiments of the present invention, the processor may provide an estimation of a duration of unavailability during the resharding process (e.g., the first duration of unavailability and/or the current duration of unavailability). In some embodiments, the processor may provide a warning notification when the duration of unavailability is equal to or greater than a predetermined amount of time. For example, the estimation of the duration of unavailability may be provided in response to an inputted inquiry by the user or manager of the sharded collection of data, and the warning notification may be provided with the estimation of the duration of unavailability if longer than the predetermined amount of time. In some embodiments, the processor may automatically perform the resharding process to completion if an instruction to commit (see above) is received after the warning notification has been provided.

In some embodiments of the present invention, the processor may provide an indication of whether one or more write operations and/or one or more read operations is or are being blocked due to the resharding process. For example, the indication may be provided in response to receiving a blockage status request from the user or manager of the sharded collection of data.

In some embodiments of the present invention, the processor may provide an indication of an amount of system resources required to reshard the sharded collection of data. For example, the indication of the amount of system resources may be provided in response to receiving the resharding instruction and the new shard key. In some embodiments, when an amount of data in the sharded collection of data is in a range of 1 gigabyte to 100 gigabytes and a number of shards of the sharded collection of data is in a range of 2 shards to 12 shards, a duration of the resharding process up to the final changeover procedure may be in a range of 2.5 seconds to less than 24 minutes. In some embodiments, when an amount of data in the sharded collection of data is in a range of 1 gigabyte to 1 terabyte and when a number of shards storing the sharded collection of data is in a range of 2 shards to 12 shards, a duration of the resharding process up to the final changeover procedure may be in a range of 2.5 seconds to less than 4 hours.

FIG. 3 shows a flowchart 3000 for aspects of a computer-implemented procedure for automated resharding, according to some embodiments of the present invention. At act 3002, a processor may receive an instruction to reshard a sharded collection of data stored in donor shards. The processor may be comprised of one or more CPUs (e.g., the CPU 1001 of the database server 1000). For example, the owner or manager of the sharded collection of data may send a command to a resharding module stored in the server to initiate an automatic resharding process according to computer-readable code stored in the resharding module. Along with the instruction, the processor may receive a first shard key. The sharded collection of data may be distributed in the donor shards according to the first shard key.

At act 3004, the processor may receive a new shard key, which may be used by the processor in the resharding process to redistribute the sharded collection of data in recipient shards. In some embodiments, the new shard key may be provided with the instruction to reshard the collection. In some embodiments, the processor may provide an indication of an amount of system resources required to reshard the sharded collection of data. For example, the indication of the amount of system resources may be provided in response to receiving the instruction to reshard and the new shard key. In some embodiments, when an amount of data in the sharded collection of data is in a range of 1 gigabyte to 100 gigabytes and a number of shards of the sharded collection of data may be in a range of 2 shards to 12 shards, a duration of the resharding process up to the final changeover procedure is in a range of 2.5 seconds to less than 24 minutes. In some embodiments, when an amount of data in the sharded collection of data is in a range of 1 gigabyte to 1 terabyte and when a number of shards storing the sharded collection of data is in a range of 2 shards to 12 shards, a duration of the resharding process up to the final changeover procedure may be in a range of 2.5 seconds to less than 4 hours. In some embodiments, the owner or manager may provide to the processor a confirmation that sufficient storage space is available for resharding the sharded collection of data.

At act 3006, the processor may notify each of the donor shards that resharding has been requested and to prepare for a resharding process. Each donor shard may then perform a preparation procedure to ensure that all requests for read/write operations from/to the donor shard to be tracked and properly logged after commencement of the resharding process, to ensure that no request is lost during the resharding process. In some embodiments of the present invention, communications between the processor and the donor shards are via database servers managing the donor shards. Upon completion of the preparation procedure, each donor shard may communicate a ready notification to the processor, indicating that the donor shard is in a ready state for the resharding process.

In some embodiments of the present invention, the processor may designate a cluster of database servers to store the recipient shards and may notify the cluster to prepare the recipient shards for the resharding process. In some embodiments, the recipient shards may individually notify the processor when the recipient shards are ready for the resharding process. The processor may provide the first shard key and/or the new shard key to each of the donor shards and each of the recipient shards. In some embodiments, the donor shards may serve a dual role and may also serve as the recipient shards, with the resharded collection of data being sharded differently in the recipient shards (i.e., sharded according to the new shard key) than the sharded collection of data (i.e., sharded according to the first shard key). In some embodiments, one or more database servers storing the donor shards may also be included in the cluster of servers designated by the processor to store the recipient shards.

At act 3008, after the processor has received the ready notifications from all of the donor shards, the processor may issue a start instruction to the donor shards and the recipient shards to commence the resharding process. Upon receiving the start instruction, each recipient shard may start copying one or more items of the sharded collection of data from one or more of the donor shards. Each recipient shard may use the new shard key to determine the items to be copied, and may use the first shard key to determine where the items to be copied are located (i.e., which of the donor shards stores the items to be copied). For example, upon determining a group of items to be copied from a particular donor shard, a recipient shard may copy the group of items from the donor shard as a chunk. In some embodiments, each of the donor shards may keep track of each item that is copied by logging a time of completion of the copying and a destination of the item (e.g., an identifier of the recipient shard that copied the item). Similarly, each of the recipient shards may keep track of each item that is copied by logging a time of storage of the item in the recipient shard and an origin of the item (e.g., an identifier of the donor shard from where the item was copied).

In some embodiments of the present invention, the processor may monitor for additional instructions from the owner or manager of the sharded collection of data. At act 3010, a determination may be made as to whether a cancellation instruction has been received. That is, any time prior to completion of the resharding process, the owner or manager of the collection may abort the resharding process. If the answer is yes, at act 3012, the procedure for automated resharding may end without completion. If the answer is no, the resharding process continues.

Each of the donor shards may notify the processor upon completion of copying of all items of data of the donor shard by one or more of the recipient shards. Similarly, each of the recipient shards may notify the processor upon completion of storing of all items of data to be copied from one or more of the donor shards and stored by the recipient shard. At act 3014, after completion notifications have been received from at least all of the recipient shards, the procedure for automated resharding may proceed to routine C, where a final changeover procedure is performed. A description of the final changeover procedure of routine C is given above and in FIG. 2D.

Example Implementations

The following are non-limiting examples of how various aspects of a resharding process according to the technology described above may be implemented. As will be appreciated, implementations other than those described below may be used without departing from the spirit and/or scope of the resharding technology disclosed herein.

Example 1—Lifecycle of a Resharding Operation

A shard may play multiple roles in a resharding operation, for example: donor shard and recipient shard. Donor shards may be shards that currently "own" chunks of a collection of data that was sharded according to a current shard key. In this example, the collection of data may be a collection of documents. Recipient shards may be shards that "own" chunks of the collection of data that, after resharding, would be sharded according to a new shard key. It should be understood that, when a shard is indicated to "own" data, the shard may be configured to manage, host, control, and/or have responsibility for the "owned" data. If zone restrictions are in use, the recipient shards also may be restricted by zones. In some cases, as noted above, a shard may play both the role of a donor shard and a recipient shard concurrently. In some cases, unless shard zones are being used, the set of donor shards of a collection of data before resharding may be the same as the set of recipient shards for the collection of data after resharding, although the collection of data may be distributed differently in the recipient shards compared with the distribution of the collection of data in the donor shards. In some examples, a config server primary may be chosen to be a resharding coordinator. In other examples, resharding may take place without the resharding coordinator being a config server primary. Config servers may be devices that store metadata for a sharded cluster. The metadata may reflect state and organization for all data and components within the sharded cluster. The metadata may include a list of chunks on every shard and ranges that define the chunks.

According to some embodiments of the present technology, various aspects of the resharding operation may be described according to phases. In some embodiments, the phases may be ordered according to the discussion below. In other embodiments, however, the resharding operation may execute in a different order than the order in the discussion below. In some embodiments, aspects of the resharding operation discussed below may be combined and/or one or more of the aspects may be omitted.

Initialization Phase—In this phase, a balancer may determine a new initial split for dividing the sharded collection (i.e., the sharded collection of data to be resharded). The resharding coordinator may durably record that the resharding operation has started by transactionally: (a) updating an entry in config.collections for the existing sharded collection (i.e., sharded according to the current shard key) to indicate a new (target) shard key and to prevent new chunk migrations from successfully committing. The term "config.collections" may refer to a collection of documents corresponding to sharded collections stored in the cluster, with each sharded collection being associated with a corresponding document storing information about the sharded collection; (b) inserting a new entry into config.collections for the new sharded collection (i.e., sharded according to the new shard key); (c) inserting new entries into config.chunks for the new sharded collection's routing table (as determined by the new initial split). The term "config.chunks" may refer to a collection of documents for chunks stored in the cluster, with each chunk being associated with a corresponding document storing information about the chunk; and (d) inserting new entries into config.tags for any zone restrictions for the new sharded collection. The term "config.tags" may refer to a collection of documents storing information relating to zone ranges stored in the cluster. The resharding coordinator may instruct each donor shard primary to refresh the donor shard primary's shard version for the existing sharded collection. The resharding coordinator may instruct each recipient shard primary to refresh the recipient shard primary's shard version for a temporary resharding collection. Upon completion of this phase, the donor and recipient shards may be synced and therefore this phase may be referred to as an initial sync phase.

Index Phase—In this phase, shards may be configured to: (a) [recipient] create a new, empty sharded collection with the same collection options as the existing sharded collection. This new sharded collection may be the target for where recipient shards do their writes; (b) [recipient] build necessary indexes. These indexes may include all existing indexes of the sharded collection and an index compatible with the new shard key if such an index does not already exist of the sharded collection. These tasks may be executed by each shard independently. The notation "[recipient]" may be used herein to indicate that the task is executed by a recipient shard. The notation "[donor]" may be used herein to indicate that the task is executed by a donor shard. The notation "[coordinator]" may be used herein to indicate that the task is executed by the resharding coordinator.

Clone, Apply, and Catch-Up Phases—In these phases, shards may be configured to: (a) [recipient] clone an initial copy of the documents the shards would own under the new shard key. Unlike in the initial sync phase, completion of this task does mean a recipient shard has a consistent snapshot of the documents the recipient shard would manage according to the new shard key. In this example, the cloning procedure may read from a global point-in-time across all donor shards, which enables identification of error(s), including, for example, the presence of duplicate IDs; (b) [recipient] durably report to the resharding coordinator that the recipient shard has entered "steady-state"; (c) [recipient] begin applying oplog entries from all donor shards from after a timestamp used in the cloning procedure; (d) [coordinator] when the last recipient shard has reported to the resharding coordinator that the recipient shard has entered "steady-state", the resharding coordinator begins monitoring when to engage a critical section on all of the donor shards. A user or operator may also run a command to manually engage the critical section on all of the donor shards (e.g., a commitReshardCollection command); (e) [donor] learn from the resharding coordinator to engage the critical section; (f) [donor] durably report to each recipient shard via an oplog entry that the donor shard has entered a "disallowing writes to collection being resharded" state; (g) [recipient] finish applying oplog entries through where each donor shard had reported that the donor shard has entered the "disallowing writes to collection being resharded" state; and (h) [recipient] durably report to the resharding coordinator that the recipient shard has entered the "strict consistency" state. These tasks may be executed by each shard independently.

Commit Phase—In this phase, when the last recipient shard has reported to the resharding coordinator that the recipient shard has entered the "strict consistency" state, the resharding coordinator may durably record on the resharding coordinator itself a decision to commit the resharding operation. The resharding coordinator may install the new routing table for the new sharded collection by transactionally: (a) updating the config.collections entry with details for the new sharded collection (e.g., new collection UUID, new shard key, and using a new epoch); (b) replacing all of the old chunks in config.chunks with the new chunks for the new sharded collection (and using a new epoch); and (c) replacing all old zone mappings with zone mappings for the new sharded collection (and using a new epoch). The resharding coordinator may instruct each donor and recipient shard primary, independently, to refresh. Upon learning the new shard version, each recipient shard primary, independently, may rename the new sharded collection on top of the existing sharded collection. Writes may then no longer be disallowed to the sharded collection, i.e., the newly resharded collection. Upon learning the new shard version, each donor shard primary, independently, may drop the existing sharded collection.

Example 2—Procedure for Atlas Search to Build FTS Index on New Sharded Collection This example builds on Example 1. Atlas Search is a suite of applications of MongoDB, which is a known database system. Features and functions of the known MongoDB database system may be enhanced to provide a new resharding functionality, such as through use of the resharding techniques described herein, which may improve the technology underlying the MongoDB database system. For example, various embodiments of the present invention described herein may allow the MongoDB database system to execute functions and operations previously unavailable. The example implementations provided below and/or elsewhere herein may be used to improve Atlas Search to incorporate the resharding techniques described herein. Atlas Search may be used to speculatively build a new full text search (FTS) index on the new sharded collection (e.g., <database>.system.resharding.<sourceUUID>) while the resharding operation is in progress. Starting to build the new FTS index when the resharding operation first starts may enable Atlas Search to have the new FTS index be more up-to-date upon the resharding operation succeeding, i.e., upon a successful completion of the resharding operation. In some cases, Atlas Search may still maintain the existing FTS index for the existing or old sharded collection (e.g., <database>.<collection>) because it is possible for the resharding operation to not succeed.

An assumption of this procedure is that Atlas Search may maintain change stream cursors for the existing or old sharded collection, even on new or replica-set shards that do not own or contain any chunks from the old sharded collection. In some cases, Atlas Search may have a change stream cursor for <database>.<collection> open directly on a replica set shard. The procedure may progress as follows:

1. A resharding operation for <database>.<collection> begins. On each recipient shard: (a) a 'create' oplog entry is written for <database>.system.resharding.<sourceUUID>; (b) a no-op oplog entry of the following form is written to the recipient shard's oplog:
{
  op: "n",
  ns: "<database>.<collection>", ui: <sourceUUID>,
  o: {msg: "Created temporary resharding collection" },
  02: {type: "reshardBegin", reshardingUUID: <reshardingUUID>},
  fromMigrate: true,
}
(c) the recipient shard transitions to an initializing state. In some cases, the recipient shard primary may not remember prior to transitioning to the initializing state whether the recipient shard primary has already written a reshardBegin no-op oplog entry (e.g., an entry indicating commencement of resharding). Therefore, it is possible for multiple of these no-op oplog entries to be written to the oplog if a primary failover occurs, and these no-op oplog entries would all have the same <reshardingUUID>. It may be guaranteed that no writes to the new sharded collection of data would have taken place yet, in which case Atlas Search may only open one change event cursor despite there being duplicate reshardBegin change events; however, it will not matter which reshardBegin change event is used for the startAtOperationTime (e.g., a resharding start time).

2. If the replica set shard has the recipient role, then a reshardBegin change event may be emitted (issued) for the change stream cursor on <database>.<collection> as a result of the reshardBegin no-op oplog entry mentioned above. The reshardBegin change event may include a <reshardingUUID>, which may be universal unique identifier for the new sharded collection of data.

3. Atlas Search may see the reshardBegin change event and may open a new change stream cursor for <database>.system.resharding.<sourceUUID>. The new change stream cursor may specify a startAtOperationTime of the clusterTime for the reshardBegin change event, to avoid missing any change events. Alternatively, Atlas Search may use Atlas Search's initial sync procedure to copy the <database>.system.resharding.<sourceUUID> collection. It is possible for a find( )operation on <database>.system.resharding.<sourceUUID> to fail due to a 'rename' (e.g., a successful resharding operation) or a 'drop' (e.g., a failed resharding operation) already having occurred by the time the original change stream sees the reshardBegin event. Atlas Search may continue processing the change stream cursor on <database>.<collection> until Atlas Search eventually sees a 'rename' change event and a subsequent 'invalidate' change event.

4. Atlas Search may receive 'insert', 'update', 'replace', and 'delete' change events on the <database>.system.resharding.<sourceUUID> collection. A no-op oplog entry of the following form may be written to the recipient shard's oplog upon the recipient shard entering a state of strict consistency:
{
  op: "n",
  ns: "<database>.system.resharding.<sourceUUID>",
  ui: <reshardingUUID>,
  o: {msg: "Temporary resharding collection now has strictly consistent view of the data"},
  o2: {type: "reshardDoneCatchUp", reshardingUUID: <reshardingUUID>},
  fromMigrate: true,
}
Similar to the reshardBegin oplog entry, a reshardDoneCatchUp oplog entry may be written to the oplog multiple times. However, unlike the reshardBegin oplog entry, there may be 'insert', 'update', 'replace', and 'delete' change events in between these occurrences. Atlas Search may only pay attention to the first reshardDoneCatchUp change event to know when the recipient shard has entered the state of strict consistency. A reshardDoneCatchUp change event may be emitted for the change stream cursor on <database>.system.resharding.<sourceUUID> as a result of the reshardDoneCatchUp no-op oplog entry.

5. The resharding operation for <database>.<collection> succeeds.

6. If the replica set shard has the recipient role, then a 'rename' change event may be emitted for both the change stream cursor on <database>.<collection> and for the change stream cursor on <database>.system.resharding.<sourceUUID>.

7. Upon receiving an 'invalidate' change event immediately following a 'rename' change event from either the change stream cursor on <database>.<collection> or from <database>.system.resharding.<sourceUUID>, Atlas Search may drop the existing FTS index and close the change stream cursor on <database>.<collection>.

8. Upon receiving the 'invalidate' change event immediately following the 'rename' change event from the change stream cursor on <database>.system.resharding.<sourceUUID>, the change stream cursor on <database>.system.resharding.<sourceUUID> may be closed and a new change stream cursor on <database>.<collection> may be opened. The new change stream cursor may specify a startAfter time with a resume token for the 'invalidate' change event after the 'rename' change event, to avoid missing any change events.

9. If the replica set shard only has the donor role, then a 'drop' change event may be emitted for the change stream cursor on <database>.<collection>.

10. Upon receiving the 'drop' change event, Atlas Search may drop the existing FTS index and close the change stream cursor on <database>.<collection>.

If the resharding operation does not succeed, some of the numbered items above may change, as follows: (5-fail) The resharding operation for <database>.<collection> fails; (6-fail) If the replica set shard has the recipient role, then nothing may be emitted for the change stream cursor on <database>.<collection> and a 'drop' change event may be emitted for the change stream cursor on <database>.system.resharding.<sourceUUID>; (7-fail) Upon receiving the 'drop' change event, Atlas Search may drop the new FTS index and close the change stream cursor on <database>.system.resharding.<sourceUUID>; and (8-fail) Atlas Search may continue to receive 'insert', 'update', 'replace', and 'delete' change events on <database>.<collection> similar to before the resharding operation.

Example 3—Callout for Atlas Search: Inconsistent Log Entries by Recipient Shards In some cases, recipient shards may not apply oplog entries from donor shards in a causally consistent way. Such inconsistencies may be acceptable during the resharding operation because the new sharded collection cannot be read from until the resharding operation has finished. However, in order for recipient shards to apply oplog entries from donor shards in an eventually consistent way, Atlas Search may call out such inconsistencies. The following are examples of how an oplog applier may violate causality during a resharding operation: operations may be reordered according to how they are applied on the recipient shard from how their optime order had them be applied on the donor shard; operations that were performed atomically as a multi-document transaction on the donor shard may not be performed atomically on the recipient shard; and operations may be applied more than once on the recipient shard due to primary failovers on the recipient shard.

Example 4—State Changes

In some cases, recipient shards and donor shards may detect state changes indicating the occurrence of a resharding operation without receiving notifications or instructions from a resharding coordinator. State changes may be driven by incrementing shard versions for the original or temporary resharding collection. Participant shards know that they are involved in a resharding operation, and when to transition states, based on noticing a change in shard versions for one of the two involved collections in the resharding operation.

When participant shards become aware of state changes, each shard may do the following: (a) durably write required state changes and additional metadata to the local resharding state, then (b) asynchronously (except for collection creation) start any required tasks. Donor shards may be informed of state changes by noticing a change in the shard version for the existing sharded collection. Recipient shards may be informed of state changes by noticing a change in the shard version for the temporary resharding collection. A benefit of this approach may be that this approach may avoid having the resharding coordinator push state information to participant shards via majority writes. This approach may shift to a pull-based model, where the resharding coordinator records state changes durably, then informs participant shards that changes are available via a centrally controlled shard version.

Communications from the resharding coordinator to the participant shards may be driven by modifying new fields in the config.collections entry for the original or temporary resharding collection. Resharding-specific fields may be added to the config.collections schema. Presently (e.g., before a resharding process commences), when participant shards notice that their shard version is outdated, they may automatically query the config.collections entry for that namespace. As part of a resharding process, on the other hand, participant shards may learn state changes via the specific configuration of those new resharding fields in the collection entry. Donor shards may update from the original collection's entry, and recipient shards may update from the temporary resharding collection's entry.

Liveness may be ensured by using cache update commands (e.g., _flushRoutingTableCahceUpdates commands) with a majority write concern to update shards. After incrementing the shard versions for a collection, the resharding coordinator may send a_flushRoutingTableCacheUpdates command to each relevant shard. In some cases, a synchronization indicator (e.g., syncFromConfig) in this command may be set to true. As part of running this command, each participant shard may notice a change in the shard version and subsequently may poll the config.collections entry for updated information. The resharding coordinator may maintain an in-memory list of shards that have yet to refresh. Waiting for a majority write concern may ensure the resharding coordinator can stop trying to refresh a particular shard without the risk of the shard later forgetting the effects of the refresh due a replica set state change. The resharding coordinator may retry until all shards have refreshed or a non-retryable error occurs. Occurrence of a non-retryable error may lead to the resharding operation being aborted everywhere.

The resharding coordinator's in-memory state may be instantiated on a new resharding operation, or on primary step-up. The resharding coordinator may have a hook that runs upon its instantiation. This hook may kick off an asynchronous job that refreshes relevant shards with the same parameters described in the previous paragraph. What shards are contacted may depend on the particular state retrieved from disk (storage) for that resharding operation. This asynchronous job may end up contacting shards that have already durably completed a refresh. The job may also contact shards that have already durably completed only a portion of the refresh. The shard may reconcile the shard's own local state as part of refreshing.

Example 5—Initialization

A new initial split of the data collection may be calculated by a config server. In order to pick points for initial splits of the data (e.g., numInitialChunks-1 split points), the config server may sample some number of documents from the collection being resharded. If zones are not provided by the user, the config server may send an aggregation pipeline (e.g., using $sample and $sort) to sample random documents and to sort these sampled documents by the new shard key. Since a larger sample may lead to better split points, the config server may pass numInitialChunks multiplied by a constant k as a 'size' parameter to the aggregation pipeline (e.g., to $sample). The config server may then pick every k-th document as the new split points for the collection. If this process produces fewer than numInitialChunks-1 unique split points, the config server may abort the resharding command and return an error to the user, indicating that the new shard key may have low cardinality. The user can decide to re-run the command and pass in a lower value for numInitialChunks. If zones are provided, the config server may first create a chunk for each zone and any gaps in the range not covered by the zones. If the number of chunks created is less than numInitialChunks, the config server may use the same pipeline as above to determine additional split points. In order to properly sort the sampled documents by the new shard key, an aggregation expression may be used to calculate the hash value for any hashed field in the new shard key.

The resharding coordinator may create local entries for the temporary resharding collection in the config namespace and then may instruct recipient shards to refresh their shard version, creating the collection locally in the process. The resharding coordinator, when setting up the temporary resharding collection, may write the collection's metadata to relevant config namespace metadata collections, as follows:

1. A new entry may be inserted into config.collections for a collection sharded by the new shard key under the namespace <database>.system.resharding.<sourceUUID>, with: (a) a collection name matching the existing sharded collection's UUID (this is to avoid exceeding collection name length limits), and (b) a UUID matching the resharding operation's UUID on the recipient shards. This choice for the new sharded collection's UUID may automatically unify log messages for operations on the namespace with the goings-on for the rest of the resharding operation.

2. New entries may be inserted into config.chunks for the new sharded collection's routing table (as determined by the new initial split).

3. New entries may be inserted into config.tags for any zone restrictions for the new sharded collection.

The resharding coordinator may then instruct recipient shards to refresh for the temporary resharding collection. This may be part of the process described above in Example 4—State Changes. As part of refreshing, each recipient shard may do the following: (a) notice that the collection possesses a namespace matching the prefix <database>.system.resharding but does not exist locally, then (b) reach out to the original collection's primary shard to retrieve collection options, then (c) reach out to the original collection's shard (e.g., with a MinKey chunk) to retrieve index information, then (d) create the collection locally, using a replica set transaction to create the collection and all of its initial indexes.

After the collection is created locally on all recipient shards, the resharding coordinator may instruct the donor shards to refresh for the temporary resharding collection as well. Each donor shard may know about the temporary collection's metadata, even if the donor shard does not have any recipient chunks itself, so that the donor shard can use the temporary collection's chunk mapping to know what writes map to what recipient shards under the new shard key.

All donor shards may supply the resharding coordinator with the timestamp that they are prepared to start receiving oplog fetch requests. After the resharding coordinator receives timestamps from all donor shards, recipient shards may then begin cloning. More specifically, at the beginning of a resharding operation, each donor shard may report to the resharding coordinator the timestamp that the donor shard has ensured oplog entries may be fetched by any relevant recipient shards. This timestamp is when the destination shard for the resharding collection has started to be recorded in all oplog entries. Once all donor shards have reported their individual timestamps to the resharding coordinator, the resharding coordinator may select the highest timestamp amongst all donor shards (e.g., the fetchTimestamp). The fetchTimestamp may be the earliest point-in-time at which every donor is prepared to receive oplog fetch requests from a recipient. Once the fetchTimestamp has been selected, the resharding coordinator may instruct recipient shards to begin simultaneously: (1) cloning the entire set of data as the set of data looked exactly at timestamp t=fetchTimestamp, and (2) fetching oplog entries from timestamp t=fetchTimestamp onwards.

All recipient shards may record the timestamp at which they have applied all oplog entries from donor shards. Although this may seem orthogonal to the initialization phase, this may be used to define the underlying on-disk schema that will be created during this phase. During a resharding operation, each donor shard may mark via the donor shard's own oplog the timestamp at which all future writes are to be completed as distributed transactions. Once a given recipient shard has received this special oplog mark from every donor, and has applied from donors all outstanding asynchronous writes, the recipient shard may durably record on itself the timestamp at which the recipient shard finished applying all writes. This timestamp may be a timestamp indicating strict consistency (e.g., strictConsistencyTimestamp) and may asserts that all future writes to documents owned by the recipient shard under the new shard key are guaranteed to occur as distributed transactions (with a higher timestamp), regardless of which donor shard owns (i.e., manages) the documents under the current key. After the strictConsistencyTimestamp has been majority committed on the recipient shard, the strictConsistencyTimestamp may be durably written to the resharding coordinator.

Example 6—Computing Minimum fetchTimestamp by Donor Shard

The donor shard may first majority write that the donor shard's state is initializing. The donor shard then ensures that the routing table for the temporary resharding collection has been written locally. A calculation process may be performed to determine the minimum fetchTimestamp and, subsequently, a routing table may be made durable.

Calculation Process—The donor shard may make a lock (e.g., a mode S lock) on the existing sharded collection. This lock acts as a barrier between outstanding writes finishing and new writes seeing the behavior of placing the destined recipient in oplog entries. The donor shard may then set an in-memory flag indicating that future writes to the collection are to include the destined recipient in oplog entries. After this flag has been set, the lock may be dropped. The donor shard then may calculate the minFetchTimestamp, which is a timestamp that guarantees that writes after this timestamp will include the destined recipient in oplog entries. The donor shard may place a barrier no-op write; the timestamp of that write may become the minFetchTimestamp. Next, the donor shard may update the donor shard's on-disk state with the minFetchTimestamp durably. The donor shard lastly may update the resharding coordinator with the minFetchTimestamp durably. At this point, the calculation process may be complete.

Ensuring a Consistent Snapshot of Durable History—In order to ensure that the minFetchTimestamp stays usable, a storage engine may be notified to pin the minFetchTimestamp. As part of normal database operations, the storage engine may drop history that is older than a timestamp designated an 'oldest timestamp'. By pinning the minFetchTimestamp, the storage engine's oldest timestamp may be assured not to advance beyond the minFetchTimestamp across donor shard primaries and secondaries.

State Change Recovery—If a donor shard transitions to primary and finds that the donor shard is an initializing state, the donor shard may check if the minFetchTimestamp has been computed. If the minFetchTimestamp has not been computed, the donor shard may repeat the calculation process. If the minFetchTimestamp has been computed, the donor shard may take the following steps: (1) set the in-memory flag to ensure that oplog entries include the destined recipient; (2) ensure that the minFetchTimestamp is majority committed; (3) contact the resharding coordinator to provide the minFetchTimestamp in case the resharding coordinator has not yet received the minFetchTimestamp; and (4) durably update the donor shard's local state to donating. If a donor shard transitions to primary and finds that the donor shard is in a donating state, the donor shard sets the in-memory flag. After that, the minFetchTimestamp may be populated in memory.

Example 7—Collection Cloning and Filtering

Recipient shards may use distributed aggregation planning to create a merged cursor across all of the donor shards. For example, MongoDB's $lookup and aggregation methods may be used. On receiving a batch of documents, the recipient shard may insert those documents into the new sharded collection <database>.system.resharding.<sourceUUID>.
For example, MongoDB's Collection::insertDocuments( )method may be used.

Example 8—Application of Oplog Entries

Resharding may be considered a special form of filtered replication because recipient shards may clone only documents that the recipient shards would eventually come to own under the new shard key and may only apply oplog entries from a particular donor shard if that donor shard owns the document under the current shard key. During apply and catch-up phases of the resharding process, to enable recipient shards to fetch these oplog entries, the oplog entries for all forms of inserts, updates, and deletes may be augmented to include the destined recipient shard under the new shard key pattern. In some cases, updates changing the shard key value under the new shard key pattern will not be replicated as op,'It' oplog entries. This means there may be a single destined recipient for each oplog entry, for example:
{
  op:
  ns: "<database>.<collection>", ui: <sourceUUID>,
  destinedRecipient: "<recipientShardId>",
  o:{ . . . },
In addition to creating the <database>.system.resharding.<sourceUUID> collection, each recipient shard may create multiple other collections, one for each donor shard, for storing documents that cannot be inserted into the temporary resharding collection due to having duplicate_id values. These other collections may be assigned names of the form config.localReshardingConflictStash.<sourceUUID>.<donorShardId> and may behave as ordinary replicated collections.

A resharding operation may abort if there are still documents in any of the resharding conflict stash collections after applying all oplog entries from the donor shard. In some cases, documents would only be remaining in the resharding conflict stash collections if a global_id uniqueness assumption had remained violated on a recipient shard.

CONCLUSION

As will be appreciated, the resharding process and/or the final changeover procedure may be performed by one or more pre-programmed processors and/or one or more processors executing code stored in one or more non-transitory computer-readable storage devices (e.g., one or more hard disks, one or more solid-state memories, one or more CD-ROMs, etc.), according to some embodiments. In some embodiments, the resharding process and/or the final changeover procedure may be performed by a special-purpose machine, which may be comprised of hardware working in conjunction with software stored on one or more non-transitory computer-readable storge devices. The special-purpose machine may be located at a single location or may be comprised of units distributed in multiple different locations. For example, the special-purpose machine may be comprised of a plurality of database servers.

Methods of resharding a sharded database according to the technology described herein may include various processes. Example methods include combinations of processes (1) through (31), as follows:

(1) A computer-implemented method of resharding a sharded database of a collection of data sharded according to a first shard key, the method comprising steps of: (a) receiving, by a processor, an instruction to reshard the sharded database; (b) receiving, by the processor, a new shard key to be used in a resharding process to reshard the sharded database; (c) determining, by the processor, whether a duration of unavailability of the sharded database during the resharding process is less than a predetermined amount of time; and (d) automatically performing, by the processor, the resharding process according to the new shard key if the duration of unavailability is less than the predetermined amount of time, to produce a resharded database of the collection of data, wherein the sharded database is stored in one or more first memories and the resharded database is stored in one or more second memories, the one or more second memories being same as or different from the one or more first memories.

(2) The method of process (1), wherein the predetermined amount of time is 1 second.

(3) The method of process (1) or process (2), wherein the predetermined amount of time is in a range of 0.5 second to 2 seconds.

(4) The method of any one of processes (1) through (3), wherein the predetermined amount of time is in a range of 1 second to 3 seconds.

(5) The method of any one of processes (1) through (4), wherein the duration of unavailability is a delay in access to the sharded database to perform an operation to write data to the database or an operation to read data from the sharded database.

(6) The method of any one of processes (1) through (5), further comprising a step of: (e) commencing, by the processor, the resharding process prior to step (c).

(7) The method of any one of processes (1) through (6), wherein the duration of unavailability is a first duration of unavailability, and wherein the method is further comprised of: (f) performing, by the processor, the resharding process for a first period of time if the first duration of unavailability is determined to be equal to or greater than the predetermined amount of time; (g) determining, by the processor after the first period of time, whether a current duration of unavailability of the sharded database is less than the first duration of unavailability; and (h) performing, by the processor, the resharding process for a second period of time if the current duration of unavailability is less than the first duration of unavailability.

(8) The method of any one of processes (1) through (7), wherein the first period of time or the second period of time is in a range of 30 seconds to 2 minutes.

(9) The method of any one of processes (1) through (8), wherein the first period of time or the second period of time is in a range of 1 minute to 3 minutes.

(10) The method of any one of processes (1) through (9), wherein the second period of time is same as the first period of time.

(11) The method of claim any one of processes (1) through (10), further comprising a step of: (i) automatically cancelling, by the processor, the resharding process if the current duration of unavailability determined at step (g) is equal to or greater than the first duration of unavailability.

(12) The method of any one of processes (1) through (11), further comprising steps of, after step (h): (j) repeating, by the processor, a combination of one or more of steps (c), (d), (f), (g); and (h) using the current duration of unavailability as the first duration of unavailability.

(13) The method of any one of processes (1) through (12), further comprising steps of: (k) permitting, by the processor, read and write operations to and from the sharded database during the resharding process until a final changeover procedure of the resharding process; and (1) preventing, by the processor, read and write operations to and from the sharded database during the final changeover procedure.

(14) The method of any one of processes (1) through (13), wherein, during the final changeover procedure: the sharded database becomes unavailable, and a resharded database resulting from the resharding process becomes available and replaces the sharded database.

(15) The method of any one of processes (1) through (14), further comprising steps of: holding, by the processor during the changeover procedure, all write requests and read requests to the sharded database; and performing, by the processor, the write requests and the read requests held in the holding step after the sharded database has been replaced by the resharded database.

(16) The method of any one of processes (1) through (15), wherein a duration of the final changeover procedure is less than a set amount of time.

(17) The method of any one of processes (1) through (16), wherein a duration of the final changeover procedure is 1 second.

(18) The method of any one of processes (1) through (17), wherein a duration of the final changeover procedure is in a range of 0.8 second to 1.2 seconds.

(19) The method of any one of processes (1) through (18), wherein a duration of the final changeover procedure is in a range of 1 second to 15 seconds.

(20) The method of any one of processes (1) through (19), wherein, when an amount of data in the sharded database is in a range of 1 gigabyte to 100 gigabytes and when the sharded databased is stored in a number of shards in a range of 2 shards to 12 shards, a duration of the resharding process up to the final changeover procedure is in a range of 2.5 seconds to less than 24 minutes.

(21) The method of any one of processes (1) through (20), wherein, when an amount of data in the sharded database is in a range of 1 gigabyte to 1 terabytes and when the sharded databased is stored in a number of shards in a range of 2 shards to 12 shards, a duration of the resharding process up to the final changeover procedure is in a range of 2.5 seconds to less than 4 hours.

(22) The method of any one of processes (1) through (21), further comprising steps of: receiving, by the processor, a cancellation instruction during the performing of the resharding process; and ending, by the processor after the receiving of the cancellation instruction, the resharding process before the resharding process is completed.

(23) The method of any one of processes (1) through (22), further comprising a step of: providing, by the processor, an estimated amount of time to completion of the resharding process.

(24) The method of any one of processes (1) through (23), wherein the providing of the estimated amount of time to completion is in response to a request received by the processor.

(25) The method of any one of processes (1) through (24), further comprising a step of: providing, by the processor, the duration of unavailability.

(26) The method of any one of processes (1) through (25), wherein the providing of the duration of unavailability is in response to a request received by the processor.

(27) The method of any one of processes (1) through (26), further comprising a step of: providing, by the processor, an indication of whether a write operation is being blocked due to the resharding process.

(28) The method of any one of processes (1) through (27), wherein the providing of the indication is comprised of: receiving, by the processor, a blockage status request, and determining, by the processor, whether a write operation currently is being blocked.

(29) The method of any one of processes (1) through (28), further comprising a step of: providing, by the processor, a warning notification when the duration of unavailability is equal to or greater than the predetermined amount of time.

(30) The method of any one of processes (1) through (29), further comprising steps of: receiving, by the processor, an instruction to commit to the resharding process; and automatically performing, by the processor, the resharding process to completion if the instruction to commit has been received after the warning notification has been provided.

(31) The method of any one of processes (1) through (30), further comprising a step of: providing, by the processor prior to step (a), an indication of an amount of system resources required to reshard the sharded database.

Computer-implemented systems for resharding a sharded database according to the technology described herein may be embodied in different configurations. An example of such configurations include configuration (32), as follows:

(32) A computer-implemented system for resharding a sharded database of a collection of data, the system comprising: a processor in communication with one or more first memories and one or more second memories, wherein the one or more first memories are for storing the collection of data according to a first shard key corresponding to the sharded database, and wherein the one or more second memories are for storing the collection of data according to a new shard key corresponding to a resharded database, the new shard key being different from the first shard key, the processor being programmed to perform acts comprised of: (a) receiving an instruction to reshard the sharded database; (b) receiving the new shard key to be used in a resharding process to reshard the sharded database; (c) determining whether a duration of unavailability of the sharded database during the resharding process is less than a predetermined amount of time; and (d) automatically performing the resharding process according to the new shard key, if the duration of unavailability is less than the predetermined amount of time, to produce the resharded collection.

Non-transitory computer-readable media storing computer-executable code to perform a method of resharding a sharded database according to the technology described herein may be embodied in different configurations. An example of such configurations include configuration (33), as follows:

(33) A computer-readable storage medium storing code that, when executed by a processor, causes the processor to perform a method of resharding a sharded database of a collection of data sharded according to a first shard key, the method comprising steps of: (a) receiving an instruction to reshard the sharded database; (b) receiving a new shard key to be used in a resharding process to reshard the sharded database; (c) determining whether a duration of unavailability of the sharded database during the resharding process is less than a predetermined amount of time; and (d) automatically performing the resharding process according to the new shard key to produce a resharded database of the collection of data, if the duration of unavailability is less than the predetermined amount of time.

Methods of resharding a sharded database according to the technology described herein may include various processes. Example methods include combinations of processes (34) through (37), as follows:

(34) A computer-implemented method of resharding a sharded database of a collection of data from a plurality of donor shards of the sharded database to a plurality of recipient shards of a resharded database, the donor shards storing the collection of data according to a first shard key, the method comprising steps of: receiving, by a processing system, a new shard key for storing the collection of data in the recipient shards, the new shard key being different from the first shard key; receiving, by the processing system, an instruction to reshard the sharded database; instructing, by the processing system, the donor shards to prepare for a resharding process; instructing, by the processing system, the recipient shards to prepare for the resharding process; receiving, by the processing system, communications from the donor shards indicating that the donor shards are ready for the resharding process; instructing, by the processing system after the receiving of the communications from the donor shards, the recipient shards to copy chunks of data based on the first shard key and the new shard key; receiving, by the processing system, communications from the recipient shards indicating that the recipient shards have completed the resharding process such that the collection of data has been copied to the recipient shards; and performing, by the processing system after receiving the communications from the recipient shards, a final changeover procedure to disable the sharded database such that read and write operations to and from the collection of data in the donor shards is prevented, and to enable read and write operations to and from the collection of data in the recipient shards of the resharded database.

(35) The method of process (34), wherein the performing of the final changeover procedure is comprised of steps of: holding, by the processing system, write requests and read requests to and from the collection of data in the donor shards; and after a changeover period of time, permitting the write requests and the read requests held in the holding step to be performed to and from the collection of data in the recipient shards.

(36) The method of process (34) or process (35), wherein a duration of the final changeover procedure is less than a set amount of time.

(37) The method of any one of processes (34) through (36), wherein a duration of the final changeover procedure is 1 second.

Computer-implemented systems for resharding a sharded database according to the technology described herein may be embodied in different configurations. An example of such configurations include configuration (38), as follows:

(38) A computer-implemented system for resharding a sharded database of a collection of data from a plurality of donor shards of the sharded database to a plurality of recipient shards of a resharded database, the system comprising: a processor in communication with one or more first memories and one or more second memories, wherein the one or more first memories are for storing the collection of data in the donor shards according to a first shard key, and wherein the one or more second memories are for storing the collection of data in the recipient shards according to a new shard key different from the first shard key, the processor being programmed to perform acts comprised of: receiving the new shard key and an instruction to reshard the sharded database according to the new shard key; instructing the donor shards to prepare for a resharding process; instructing the recipient shards to prepare for the resharding process; receiving communications from the donor shards indicating that the donor shards are ready for the resharding process; after receiving the communications from the donor shards, instructing the recipient shards to copy chunks of data based on the first shard key and the new shard key; receiving communications from the recipient shards indicating that the recipient shards have completed the resharding process such that the collection of data has been copied to the recipient shards; and after receiving the communications from the recipient shards, performing a final changeover procedure to disable the sharded database such that read and write operations to and from the collection of data in the donor shards is prevented, and to enable read and write operations to and from the collection of data in the recipient shards of the resharded database.

Non-transitory computer-readable media storing computer-executable code to perform a method of resharding a sharded database according to the technology described herein may be embodied in different configurations. An example of such configurations include configuration (39), as follows:

(39) A computer-readable storage medium storing code that, when executed by a processor, causes the processor to perform a method of resharding a sharded database of a collection of data from a plurality of donor shards configured according to a first shard key the sharded database to a plurality of recipient shards configured according to a new shard key of a resharded database, the method comprising steps of: receiving the new shard key and an instruction to reshard the sharded database according to the new shard key; instructing the donor shards to prepare for a resharding process; instructing the recipient shards to prepare for the resharding process; receiving communications from the donor shards indicating that the donor shards are ready for the resharding process; after receiving the communications from the donor shards, instructing the recipient shards to copy chunks of data based on the first shard key and the new shard key; receiving communications from the recipient shards indicating that the recipient shards have completed the resharding process such that the collection of data has been copied to the recipient shards; and after receiving the communications from the recipient shards, performing a final changeover procedure to disable the sharded database such that read and write operations to and from the collection of data in the donor shards is prevented, and to enable read and write operations to and from the collection of data in the recipient shards of the resharded database.

Methods of resharding a sharded database according to the technology described herein may include various processes. Example methods include combinations of processes (40) through (50), as follows:

(40) A computer-implemented method of resharding a sharded database of a collection of data from a plurality of donor shards of the sharded database to a plurality of recipient shards of a resharded database, the donor shards being described by a first shard key and the recipient shards being described by a new shard key different from the first shard key, the method comprising steps of: for each donor shard: notifying, by a processing system, the donor shard of a resharding process for the sharded database; instructing, by the processing system, the donor shard to perform a donor-refresh operation to refresh contents of the donor shard; receiving, by the processing system, from the donor shard a timestamp indicating a time of the donor-refresh operation, the timestamp indicating an initial time at which copying of the contents of the donor shard is permitted; and instructing, by the processing system, the donor shard to permit any of the recipient shards to obtain one or more chunks of data included in the contents of the donor shard; and for each recipient shard: notifying, by the processing system, the recipient shard of the first shard key and the new shard key; instructing, by the processing system, the recipient shard to perform a recipient-refresh operation to refresh contents of the recipient shard; receiving, by the processing system, from the recipient shard a timestamp indicating a time of the recipient-refresh operation, the timestamp indicating an initial time at which the recipient shard is ready to obtain chunks of data from any of the donor shards; and instructing, by the processing system after the timestamp has been received from the recipient shard and after respective timestamps have been received from all the donor shards, the recipient shard to begin copying one or more relevant chunks of data from one or more of the donor shards, the relevant chunks of data being determined according to the first shard key and the new shard key.

(41) The method of process (40), wherein the instructing of the recipient shard to begin copying occurs after respective timestamps have been received from all the recipient shards.

(42) The method of process (40) or process (41), further comprising a step of: for each donor shard: notifying, by the processing system, the donor shard of the new shard key.

(43) The method of any one of processes (40) through (42), further comprising a step of: for each donor shard: receiving, by the processing system, a copying-complete notification from the donor shard that all chunks of data corresponding to the donor shard have been copied by at least one of the recipient shards.

(44) The method of any one of processes (40) through (43), wherein the copying-complete notification from the donor shard indicates that each chunk of data of the donor shard has been copied by a relevant one or the recipient shards according to the new shard key.

(45) The method of any one of processes (40) through (44), further comprising a step of: for each recipient shard: receiving, by the processing system, a copying-complete notification from the recipient shard that all chunks of data corresponding to the recipient shard have been copied from at least one of the donor shards.

(46) The method of any one of processes (40) through (45), wherein the copying-complete notification from the recipient shard indicates that all chunks of data relevant to the recipient shard according to the new shard key have been identified in one or more of relevant donor shards according to the first shard key and have been copied from the one or more relevant donor shards.

(47) The method of any one of processes (40) through (46), further comprising steps of: performing, by the processing system, a final changeover procedure to disable the sharded database such that read and write operations to and from the collection of data in the donor shards is prevented, and to enable read and write operations to and from the collection of data in the recipient shards of the resharded database.

(48) The method of any one of processes (40) through (47), wherein the performing of the final changeover procedure is comprised of steps of: holding, by the processing system, write requests and read requests to and from the collection of data in the donor shards; and after a changeover period of time, permitting the write requests and the read requests held in the holding step to be performed to and from the collection of data in the recipient shards.

(49) The method of any one of processes (40) through (48), wherein a duration of the final changeover procedure is less than a set amount of time.

(50) The method of any one of processes (40) through (49), wherein a duration of the final changeover procedure is 1 second.

Computer-implemented systems for resharding a sharded database according to the technology described herein may be embodied in different configurations. An example of such configurations include configuration (51), as follows:

(51) A computer-implemented system for resharding a sharded database of a collection of data from a plurality of donor shards of the sharded database to a plurality of recipient shards of a resharded database, the donor shards being described by a first shard key and the recipient shards being described by a new shard key different from the first shard key, the system comprising: a processor in communication with one or more first memories and one or more second memories, wherein the one or more first memories are for storing the collection of data in the donor shard according to the first shard key, and wherein the one or more second memories are for storing the collection of data in the recipient shards according to the new shard key, the processor being programmed to perform acts comprised of: for each donor shard: notifying the donor shard of a resharding process for the sharded database; instructing the donor shard to perform a donor-refresh operation to refresh contents of the donor shard; receiving from the donor shard a timestamp indicating a time of the donor-refresh operation, the timestamp indicating an initial time at which copying of the contents of the donor shard is permitted; and instructing the donor shard to permit any of the recipient shards to obtain one or more chunks of data included in the contents of the donor shard; for each recipient shard: notifying the recipient shard of the first shard key and the new shard key; instructing the recipient shard to perform a recipient-refresh operation to refresh contents of the recipient shard; receiving from the recipient shard a timestamp indicating a time of the recipient-refresh operation, the timestamp indicating an initial time at which the recipient shard is ready to obtain chunks of data from any of the donor shards; and after the timestamp has been received from the recipient shard and after respective timestamps have been received from all the donor shards, instructing the recipient shard to begin copying one or more relevant chunks of data from one or more of the donor shards, the relevant chunks of data being determined according to the first shard key and the new shard key.

Non-transitory computer-readable media storing computer-executable code to perform a method of resharding a sharded database according to the technology described herein may be embodied in different configurations. An example of such configurations include configuration (52), as follows:

(52) A computer-readable storage medium storing code that, when executed by a processor, causes the processor to perform a method of resharding a sharded database of a collection of data from a plurality of donor shards of the sharded database to a plurality of recipient shards of a resharded database, the donor shards being described by a first shard key and the recipient shards being described by a new shard key different from the first shard key, the method comprising: for each donor shard: notifying the donor shard of a resharding process for the sharded database; instructing the donor shard to perform a donor-refresh operation to refresh contents of the donor shard; receiving from the donor shard a timestamp indicating a time of the donor-refresh operation, the timestamp indicating an initial time at which copying of the contents of the donor shard is permitted; and instructing the donor shard to permit any of the recipient shards to obtain one or more chunks of data included in the contents of the donor shard; for each recipient shard: notifying the recipient shard of the first shard key and the new shard key; instructing the recipient shard to perform a recipient-refresh operation to refresh contents of the recipient shard; receiving from the recipient shard a timestamp indicating a time of the recipient-refresh operation, the timestamp indicating an initial time at which the recipient shard is ready to obtain chunks of data from any of the donor shards; and after the timestamp has been received from the recipient shard and after respective timestamps have been received from all the donor shards, instructing the recipient shard to begin copying one or more relevant chunks of data from one or more of the donor shards, the relevant chunks of data being determined according to the first shard key and the new shard key.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Unless stated otherwise, the terms "approximately" and "about" are used to mean within ±20% of a target value in some embodiments, within ±10% of a target value in some embodiments, within ±5% of a target value in some embodiments, and yet within ±2% of a target value in some embodiments. The terms "approximately" and "about" can include the target value. The term "essentially" is used to mean within ±3% of a target value.

The technology described herein may be embodied as a method, of which at least some acts have been described. The acts performed as part of the method may be ordered in any suitable way. Accordingly, embodiments may be implemented in which acts are performed in an order different than described, which may include performing some acts simultaneously, even though described as sequential acts in illustrative embodiments. Additionally, a method may include more acts than those described, in some embodiments, and fewer acts than those described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The indefinite articles "a" and "an," as used herein in the specification and in the claims, unless clearly indicated to the contrary, should be understood to mean "at least one."

Any use of the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Any use of the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

Also, some of the embodiments described above may be implemented as one or more method(s), of which some examples have been provided. The acts performed as part of the method(s) may be ordered in any suitable way. Accordingly, embodiments may be constructed in which acts are performed in an order different than illustrated or described herein, which may include performing some acts simultaneously, even though shown as sequential acts in illustrative embodiments.

Further, although advantages of the present invention may be indicated, it should be appreciated that not every embodiment of the invention will include every described advantage. Some embodiments may not implement any features described as advantageous herein. Accordingly, the foregoing description and attached drawings are by way of example only.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting.

What is claimed is:

1. A computer-implemented method of resharding a sharded database of a collection of data sharded according to a first shard key, the method comprising steps of:
   (a) receiving, by a processor, an instruction to reshard the sharded database;
   (b) receiving, by the processor, a new shard key to be used in a resharding process to reshard the sharded database;
   (c) determining, by the processor, whether a duration of unavailability of the sharded database during the resharding process is less than a predetermined amount of time; and
   (d) automatically performing, by the processor, the resharding process according to the new shard key, if the duration of unavailability is less than the predetermined amount of time, to produce a resharded database of the collection of data,
   wherein the sharded database is stored in one or more first memories and the resharded database is stored in one or more second memories, the one or more second memories being same as or different from the one or more first memories,
   wherein the duration of unavailability is a first duration of unavailability, and the method is further comprised of:
   (e) performing, by the processor, the resharding process for a first period of time if the first duration of unavailability is determined to be equal to or greater than the predetermined amount of time;
   (f) determining, by the processor after the first period of time, whether a current duration of unavailability of the sharded database is less than the first duration of unavailability;
   (g) performing, by the processor, the resharding process for a second period of time if the current duration of unavailability is less than the first duration of unavailability; and
   (h) automatically cancelling, by the processor, the resharding process if the current duration of unavailability determined at step (f) is equal to or greater than the first duration of unavailability.

2. The method of claim 1, further comprising a step of:
(i) commencing, by the processor, the resharding process prior to step (c).

3. The method of claim 1, further comprising steps of, after step (g):
(j) repeating, by the processor, a combination of one or more of steps (c), (d), (e), (f); and
(k) using the current duration of unavailability as the first duration of unavailability.

4. The method of claim 1, further comprising steps of:
(l) permitting, by the processor, read and write operations to and from the sharded database during the resharding process until a final changeover procedure of the resharding process; and
(m) preventing, by the processor, read and write operations to and from the sharded database during the final changeover procedure.

5. The method of claim 4, wherein, during the final changeover procedure:
the sharded database becomes unavailable, and
a resharded database resulting from the resharding process becomes available and replaces the sharded database.

6. The method of claim 5, further comprising steps of:
holding, by the processor during the changeover procedure, all write requests and read requests to the sharded database; and
performing, by the processor, the write requests and the read requests held in the holding step after the sharded database has been replaced by the resharded database.

7. The method of claim 1, further comprising steps of:
receiving, by the processor, a cancellation instruction during the performing of the resharding process; and
ending, by the processor after the receiving of the cancellation instruction, the resharding process before the resharding process is completed.

8. The method of claim 1, further comprising a step of:
providing, by the processor, an estimated amount of time to completion of the resharding process.

9. The method of claim 8, wherein the providing of the estimated amount of time to completion is in response to a request received by the processor.

10. The method of claim 1, further comprising a step of:
providing, by the processor, the duration of unavailability.

11. The method of claim 10, wherein the providing of the duration of unavailability is in response to a request received by the processor.

12. The method of claim 1, further comprising a step of:
providing, by the processor, an indication of whether a write operation is being blocked due to the resharding process.

13. The method of claim 12, wherein the providing of the indication is comprised of:
receiving, by the processor, a blockage status request, and
determining, by the processor, whether a write operation currently is being blocked.

14. The method of claim 1, further comprising a step of:
providing, by the processor, a warning notification when the duration of unavailability is equal to or greater than the predetermined amount of time.

15. The method of claim 14, further comprising steps of:
receiving, by the processor, an instruction to commit to the resharding process; and
automatically performing, by the processor, the resharding process to completion if the instruction to commit has been received after the warning notification has been provided.

16. The method of claim 1, further comprising a step of:
providing, by the processor prior to step (a), an indication of an amount of system resources required to reshard the sharded database.

17. A computer-implemented system for resharding a sharded database of a collection of data, the system comprising:
a processor in communication with one or more first memories and one or more second memories, wherein the one or more first memories are for storing the collection of data according to a first shard key corresponding to the sharded database, and wherein the one or more second memories are for storing the collection of data according to a new shard key corresponding to a resharded database, the new shard key being different from the first shard key, the processor being programmed to perform acts comprised of:
(a) receiving an instruction to reshard the sharded database;
(b) receiving the new shard key to be used in a resharding process to reshard the sharded database;
(c) determining whether a duration of unavailability of the sharded database during the resharding process is less than a predetermined amount of time; and
(d) automatically performing the resharding process according to the new shard key, if the duration of unavailability is less than the predetermined amount of time, to produce the resharded database,
wherein the duration of unavailability is a first duration of unavailability, and the processor being programmed to perform acts comprised of:
(e) performing, by the processor, the resharding process for a first period of time if the first duration of unavailability is determined to be equal to or greater than the predetermined amount of time;
(f) determining, by the processor after the first period of time, whether a current duration of unavailability of the sharded database is less than the first duration of unavailability;
(q) performing, by the processor, the resharding process for a second period of time if the current duration of unavailability is less than the first duration of unavailability; and
(h) automatically cancelling, by the processor, the resharding process if the current duration of unavailability determined at step (f) is equal to or greater than the first duration of unavailability.

18. A non-transitory computer-readable storage medium storing code that, when executed by a processor, causes the processor to perform a method of resharding a sharded database of a collection of data sharded according to a first shard key, the method comprising steps of:
(a) receiving an instruction to reshard the sharded database;
(b) receiving a new shard key to be used in a resharding process to reshard the sharded database;
(c) determining whether a duration of unavailability of the sharded database during the resharding process is less than a predetermined amount of time; and
(d) automatically performing the resharding process according to the new shard key to produce a resharded database of the collection of data, if the duration of unavailability is less than the predetermined amount of time;

wherein the duration of unavailability is a first duration of unavailability, and the method is further comprising:

(e) performing, by the processor, the resharding process for a first period of time if the first duration of unavailability is determined to be equal to or greater than the predetermined amount of time;

(f) determining, by the processor after the first period of time, whether a current duration of unavailability of the sharded database is less than the first duration of unavailability;

(g) performing, by the processor, the resharding process for a second period of time if the current duration of unavailability is less than the first duration of unavailability; and (h) automatically cancelling, by the processor, the resharding process if the current duration of unavailability determined at step (f) is equal to or greater than the first duration of unavailability.

* * * * *

UNITED STATES PATENT AND TRADEMARK OFFICE
CERTIFICATE OF CORRECTION

| | | |
|---|---|---|
| PATENT NO. | : 11,893,042 B2 | Page 1 of 1 |
| APPLICATION NO. | : 17/856171 | |
| DATED | : February 6, 2024 | |
| INVENTOR(S) | : Mark Porter et al. | |

It is certified that error appears in the above-identified patent and that said Letters Patent is hereby corrected as shown below:

In the Claims

Column 34, Claim 17, Line no. 42, should read:
(g) performing, by the processor, the resharding process Signed and Sealed this
Fourth Day of June, 2024

Katherine Kelly Vidal
*Director of the United States Patent and Trademark Office*